(12) United States Patent (10) Patent No.: US 12,041,208 B2
Fuji (45) Date of Patent: Jul. 16, 2024

(54) IMAGE READING APPARATUS

(71) Applicant: SEIKO EPSON CORPORATION, Tokyo (JP)

(72) Inventor: Keita Fuji, Nakama (JP)

(73) Assignee: SEIKO EPSON CORPORATION, Tokyo (JP)

( * ) Notice: Subject to any disclaimer, the term of this patent is extended or adjusted under 35 U.S.C. 154(b) by 327 days.

(21) Appl. No.: 17/546,998

(22) Filed: Dec. 9, 2021

(65) Prior Publication Data

US 2022/0182506 A1 Jun. 9, 2022

(30) Foreign Application Priority Data

Dec. 9, 2020 (JP) ................................ 2020-204197

(51) Int. Cl.
*H04N 1/04* (2006.01)
*H04N 1/00* (2006.01)
(52) U.S. Cl.
CPC ..... *H04N 1/00809* (2013.01); *H04N 1/00615* (2013.01); *H04N 1/00631* (2013.01)
(58) Field of Classification Search
USPC ................................................ 357/498, 482
See application file for complete search history.

(56) References Cited

U.S. PATENT DOCUMENTS

| 5,358,239 | A | 10/1994 | Hario et al. |
| 2010/0321741 | A1* | 12/2010 | van Os ................ H04N 1/2032 |
| | | | 713/300 |

| 2011/0273753 | A1* | 11/2011 | Yonemura .......... H04N 1/00535 |
| | | | 358/498 |

(Continued)

FOREIGN PATENT DOCUMENTS

| JP | H05147799 A | 6/1993 |
| JP | 2015070479 A | 4/2015 |

(Continued)

OTHER PUBLICATIONS

Office Action for CN Patent Application No. CN202111494387.7, issued on Nov. 13, 2023 18 pages of Office Action.

*Primary Examiner* — Cheukfan Lee
(74) *Attorney, Agent, or Firm* — CHIP LAW GROUP

(57) ABSTRACT

An image reading apparatus includes: a document transport route along which a document inserted into the image reading apparatus from a front side is transported backward; a reader that reads an image of the document; an ejection guide that upwardly guides the document being fed after the document is ejected backward from the document transport route; and a transport-force-applying mechanism that applies a transport force to the document. The transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned a second-directional side that is opposite to the first-directional side. The ejection guide is positioned asymmetrically toward the first-directional side in the width direction.

18 Claims, 20 Drawing Sheets

(56) References Cited

U.S. PATENT DOCUMENTS

| | | | |
|---|---|---|---|
| 2015/0062667 A1* | 3/2015 | Kuriki | H04N 1/00594 |
| | | | 358/474 |
| 2019/0335050 A1 | 10/2019 | Nagai et al. | |
| 2020/0344376 A1* | 10/2020 | Sasaki | B41J 29/02 |
| 2023/0262179 A1* | 8/2023 | Shuto | H04N 1/00588 |
| | | | 358/498 |

FOREIGN PATENT DOCUMENTS

| | | | |
|---|---|---|---|
| JP | 2015078053 A | 4/2015 | |
| JP | 6590054 B1 | 10/2019 | |

* cited by examiner

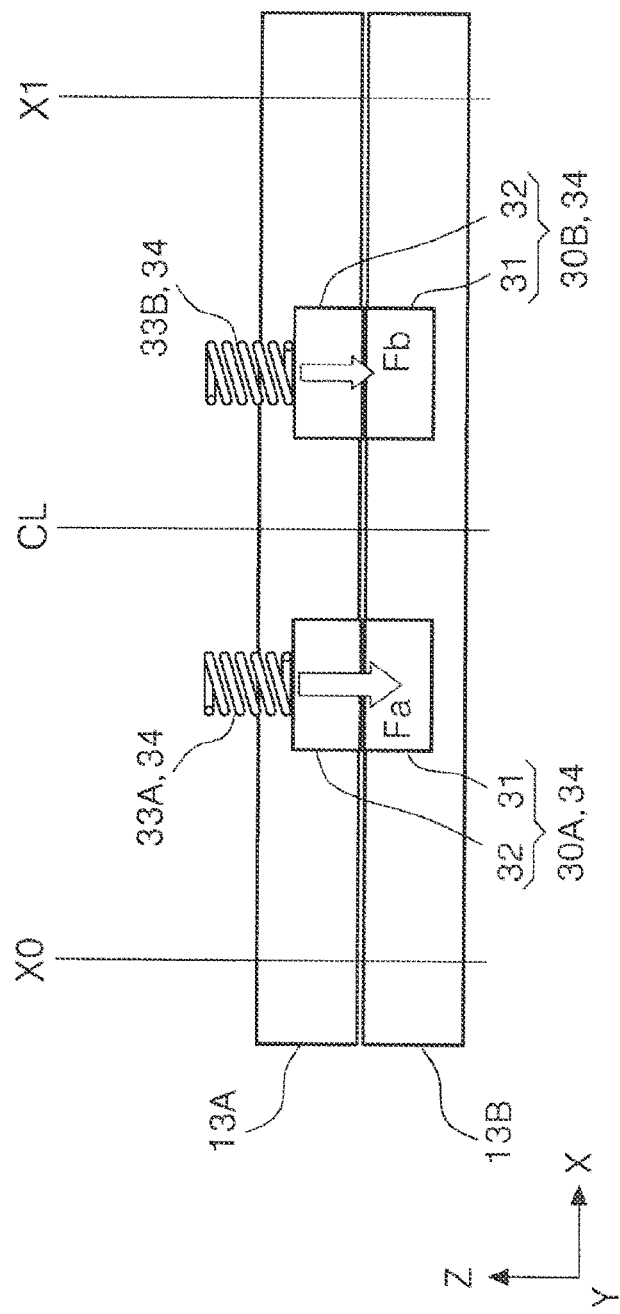

IMAGE READING APPARATUS

The present application is based on, and claims priority from JP Application Serial Number 2020-204197, filed Dec. 9, 2020, the disclosure of which is hereby incorporated by reference herein in its entirety.

BACKGROUND

1. Technical Field

The present disclosure relates to an image reading apparatus that reads images of documents.

2. Related Art

Sheet-feed types of image reading apparatuses, which are one type of image reading apparatus, are configured to read images of documents while transporting the documents. JP-A-5-147799 discloses an example of a sheet-feed type image reading apparatus. When a user inserts a document from the front side, the image reading apparatus feeds the document backward, then reads an image of the document, and ejects the document. Further, such an image reading apparatus is equipped with a guide that upwardly guides an ejected document.

When an image reading apparatus of the above type transports a document along a document transport route, a transport load is placed on the document, in which case the document may be skewed due to friction generated between the document and a route-forming member on the document transport route. This skewing tends to occur depending on some manufacturing factors such as a die for use in forming the route-forming member. More specifically, when a document is transported, the transport load placed on a first-directional side of the document tends to be heavier than the transport load placed on a second-directional side of the document (the first- and second-directional sides are both sides of the document in a width direction). This may excessively reduce the transport force applied to the first-directional side of the document, thereby causing skewing of the document.

To suppress the skewing of documents as described above, some image reading apparatuses are designed such that the transport force applied to the first-directional side of a document is set to be greater than the transport force applied to the second-directional side of the document. If such image reading apparatuses are equipped with a guide as disclosed in JP-A-5-147799, however, the guide may place the transport load on a document being transported and excessively reduce the transport force applied to the second-directional side of the document. In such a case, the resultant read image might be distorted.

SUMMARY

According to an aspect of the present disclosure, an image reading apparatus includes: a document transport route along which a document inserted into the image reading apparatus from a front side is transported backward; a reader that reads an image of the document, the reader being disposed on the document transport route; an ejection guide that upwardly guides the document being fed after the document is ejected backward from the document transport route; and a transport-force-applying mechanism that applies a transport force to the document transported on the document transport route. The transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction. The ejection guide is positioned asymmetrically toward the first-directional side in the width direction.

According to another aspect of the present disclosure, an image reading apparatus includes: a document transport route along which a document inserted into the image reading apparatus from a front side is transported backward; a reader that reads an image of the document, the reader being disposed on the document transport route; an ejection guide that upwardly guides the document being fed after the document is ejected backward from the document transport route; and a transport-force-applying mechanism that applies a transport force to the document transported on the document transport route. The transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction. The ejection guide forms a document guide route, a length of the document guide route in the width direction being shorter on the second-directional side than on the first-directional side.

According to still another aspect of the present disclosure, an image reading apparatus includes: a document transport route along which a document inserted into the image reading apparatus from a front side is transported backward; a reader that reads an image of the document, the reader being disposed on the document transport route; an ejection guide that upwardly guides the document being fed after the document is ejected backward from the document transport route; and a transport-force-applying mechanism that applies a transport force to the document transported on the document transport route. The transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction. The ejection guide places a transport load on the document, the transport load placed on the second-directional side of the document in the width direction being lighter than the transport load placed on the first-directional side of the document in the width direction.

BRIEF DESCRIPTION OF THE DRAWINGS

FIG. 22 illustrates a transport-force-applying mechanism according to another embodiment.

DESCRIPTION OF EXEMPLARY EMBODIMENTS

Figure 1:
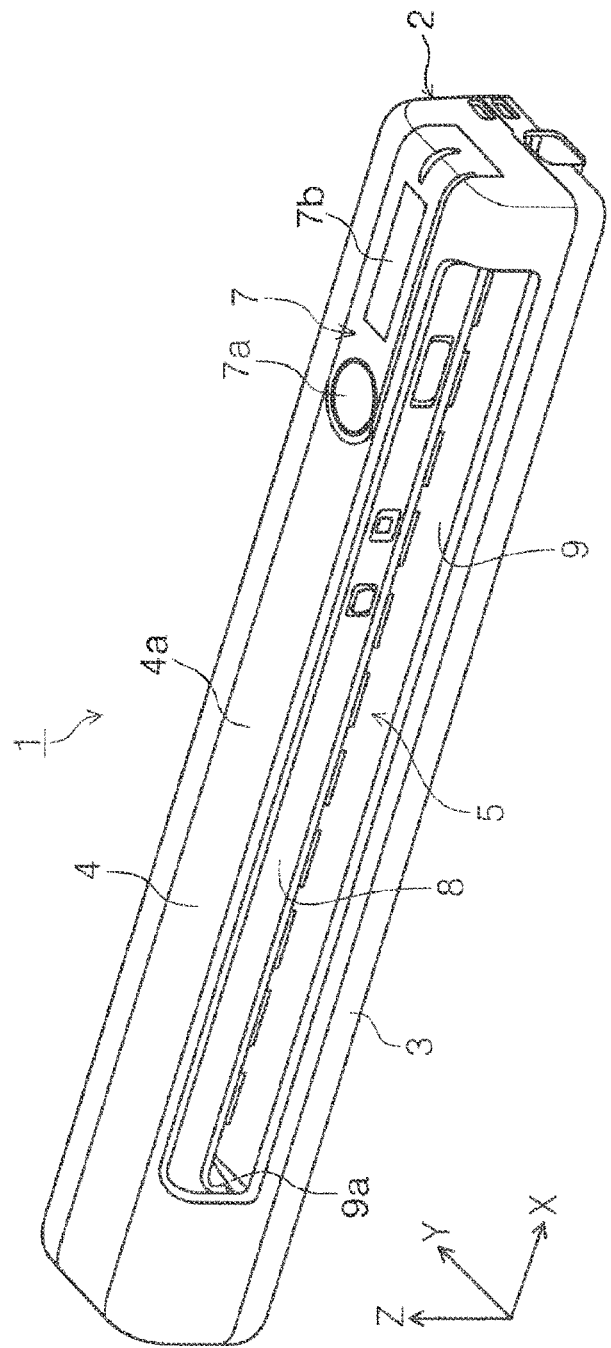
FIG. 1 is a front perspective view of a scanner with an ejection guide removed.

Some aspects of the present disclosure will be described briefly below. According to an aspect of the present disclosure, an image reading apparatus includes: a document transport route along which a document inserted into the image reading apparatus from a front side is transported backward; a reader that reads an image of the document, the reader being disposed on the document transport route; an ejection guide that upwardly guides the document being fed after the document is ejected backward from the document transport route; and a transport-force-applying mechanism that applies a transport force to the document transported on the document transport route. The transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction. The ejection guide is positioned asymmetrically toward the first-directional side in the width direction.

In the above first aspect, the transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction. In addition, the ejection guide is positioned asymmetrically toward the first-directional side in the width direction. This configuration suppresses a transport load placed by the ejection guide on a document from excessively reducing the transport force applied to the second side of the document, which is opposite to the first side. Accordingly, it is possible to reduce the risk of a resultant read image being distorted.

Herein, "the transport force applied by the transport-force-applying mechanism to a first side of the document is greater than the transport force applied by the transport-force-applying mechanism to a second side of the document" means that the transport force applied to the first side of a document with respect to the central location in the width direction is greater than the transport force applied to the second side of the document. Herein, "the ejection guide is positioned asymmetrically toward the first-directional side in the width direction" means that the area of the ejection guide between the first-directional side and the central location in the width direction is larger than the area of the ejection guide between the central location and the second-directional side in the width direction.

According to a second aspect of the present disclosure, the image reading apparatus of the first aspect may further include a configuration in which the ejection guide is disposed only within an area of the document transport route on the first-directional side with respect to a central location in the width direction.

In the above second aspect, the ejection guide may be disposed only within an area of the document transport route on the first-directional side with respect to a central location in the width direction. This configuration reliably achieves the function and effect of the above first aspect.

According to a third aspect of the present disclosure, an image reading apparatus includes: a document transport route along which a document inserted into the image reading apparatus from a front side is transported backward; a reader that reads an image of the document, the reader being disposed on the document transport route; an ejection guide that upwardly guides the document being fed after the document is ejected backward from the document transport route; and a transport-force-applying mechanism that applies a transport force to the document transported on the document transport route. The transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional that is opposite to the first-directional side in the width direction. The ejection guide forms a document guide route, a length of the document guide route in the width direction being shorter on the second-directional side than on the first-directional side.

In the above third aspect, the transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction. In addition, the ejection guide forms a document guide route, a length of the document guide route in the width direction being shorter on the second-directional side than on the first-directional side. This configuration suppresses a transport load placed by the ejection guide places on a document from excessively reducing the transport force applied to the second side of the document, which is positioned on the second-directional side. Accordingly, it is possible to reduce the risk of a resultant read image being distorted.

Herein, "the ejection guide forms a document guide route, a length of the document guide route in the width direction being shorter on the second-directional side than on the first-directional side" means that the document guide area of the ejection guide between the central location in the width direction and the second-directional side is smaller than the document guide area between the first-directional side and the central location in the width direction.

According to a fourth aspect of the present disclosure, an image reading apparatus includes: a document transport route along which a document inserted into the image reading apparatus from a front side is transported backward; a reader that reads an image of the document, the reader being disposed on the document transport route; an ejection guide that upwardly guides the document being fed after the document is ejected backward from the document transport route; and a transport-force-applying mechanism that applies a transport force to the document transported on the document transport route. The transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction. In addition, the ejection guide places a transport load on the document, the transport load placed on the second side of the document in the width direction being lighter than the transport load placed on the first side of the document in the width direction.

In the above fourth aspect, the transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction. In addition, the ejection guide places a transport load on the document, the transport load placed on the second side of the document in the width direction being lighter than the transport load placed on the first side of the document in the width direction. This configuration suppresses the transport load placed by the ejection guide on a document from excessively reducing the transport force applied to the second side of the document, which is opposite to the first side. Accordingly, it is possible to reduce the risk of a resultant read image being distorted.

According to a fifth aspect of the present disclosure, the image reading apparatus of one of the first to fourth aspects may further include a configuration in which the reader is movable toward or away from the document transport route. Furthermore, the transport-force-applying mechanism may include: a transport roller that nips the document with the reader; a first pressing member that is a pressing member disposed on the first-directional side in the width direction and that presses the reader against the transport roller; and a second pressing member that is a pressing member disposed on the second-directional side in the width direction and that presses the reader against the transport roller. Moreover, a pressing force generated by the first pressing member may be set to be greater than a pressing force generated by the second pressing member.

In the above fifth aspect, a pressing force generated by the first pressing member may be set to be greater than a pressing force generated by the second pressing member. This can adjust the magnitude, in the width direction, of the transport force applied by the transport-force-applying mechanism to a document. In this case, the transport-force-applying mechanism that adjusts the transport force can be implemented with a simple configuration.

According to a sixth aspect of the present disclosure, the image reading apparatus of one of the first to fourth aspects may further include: a second reader that reads an image of the document, the second reader being disposed opposite a first reader, the first reader corresponding to the reader; and a plurality of transport roller pairs that transport the document, the transport roller pairs being arranged on the document transport route in the width direction, the transport roller pairs being disposed upstream of the first reader and the second reader. In addition, a document nip force generated by the transport roller pair positioned on the first-directional side in the width direction may be set to be greater than a document nip force generated by the transport roller pair positioned on the second-directional side in the width direction.

In the above sixth aspect, a document nip force generated by the transport roller pair positioned on the first-directional side in the width direction may be set to be greater than a document nip force generated by the transport roller pair positioned on the second-directional side in the width direction. The magnitude of the transport force applied by the transport-force-applying mechanism to a document is adjusted in the width direction. In this case, the transport-force-applying mechanism that adjusts the transport force can be implemented with a simple configuration.

According to a seventh aspect of the present disclosure, the image reading apparatus of one of the first to sixth aspects may further include a configuration in which the ejection guide is removable from a main body in which the document transport route is formed.

In the above seventh aspect, the ejection guide may be removable from a main body in which the document transport route is formed. This configuration enables a user to remove the ejection guide from the main body when not using the ejection guide. Accordingly, it is possible to decrease the installation space of the main body, thus providing the user with good usability.

According to an eighth aspect of the present disclosure, the image reading apparatus of one of the first to seventh aspects may further include a configuration in which the ejection guide is switchable between a first state where the document being ejected is upwardly guided and a second state where a ratio of a projected area to a footprint of the image reading apparatus becomes smaller than the ratio in the first state.

In the eighth aspect, the ejection guide may be switchable between a first state where the document being ejected is upwardly guided and a second state where a ratio of a projected area to a footprint of the image reading apparatus becomes smaller than the ratio in the first state. This configuration enables a user to set the ejection guide to the second state without having to remove the ejection guide. Accordingly, it is possible to decrease the footprint of the main body, thus providing the user with good usability.

According to a ninth aspect of the present disclosure, the image reading apparatus of the eighth aspect may further include a configuration in which, when in the second state, the ejection guide is supported on an upper surface of the image reading apparatus.

In the above ninth aspect, the ejection guide, when in the second state, may be supported on an upper surface of the image reading apparatus. This configuration can support the ejection guide in the second state without using an additional component, thereby leading to a decreased overall cost.

According to a tenth aspect of the present disclosure, the image reading apparatus of the ninth aspect may further include an operation unit on the upper surface, the image reading apparatus being configured to receive various operations through the operation unit. When in the second state, the ejection guide may be disposed outside the operation unit.

In the above tenth aspect, the image reading apparatus of the ninth aspect may further include an operation unit on the upper surface, the image reading apparatus being configured to receive various operations through the operation unit. In addition, the ejection guide, when in the second state, may be disposed outside the operation unit. This configuration enables the user to operate the operation unit without being hindered by the ejection guide even when the ejection guide is in the second state.

According to an eleventh aspect of the present disclosure, the image reading apparatus of one of the eighth to tenth aspects may further include a configuration in which, when in the second state, the ejection guide is positioned so as not to make contact with the document being ejected backward from the document transport route.

In the above eleventh aspect, the ejection guide, when in the second state, may be positioned so as not to make contact with the document being ejected backward from the document transport route. This configuration enables a user to operate the image reading apparatus even when the ejection guide is attached to the main body and set to the second state, thereby providing the user with good usability.

According to a twelfth aspect of the present disclosure, the image reading apparatus of one of the eighth to eleventh aspects may further include a configuration in which the ejection guide has a through-hole that, when the ejection guide is in the second state, enables a document that is smaller than the ejection guide in the width direction to pass backward through the through-hole.

Examples of small documents are cash cards, credit cards, and other plastic cards, the sizes of which are specified by international specifications ISO/IEC7810, for example. In such a case, some image reading apparatuses may fail to invert such small documents over the ejection guide due to their rigidity. In the above twelfth aspect, however, the ejection guide may have a through-hole that, when the ejection guide is in the second state, enables a document that is smaller than the ejection guide in the width direction to pass backward through the through-hole. This configuration can eject rigid documents backward to the outside without inverting those documents. Thus, the image reading apparatus can read images of rigid documents, as described above, with the ejection guide attached to the main body.

Next, some embodiments of the present disclosure will be described in detail below with reference to the accompanying drawings. Herein, a sheet feed scanner 1 (referred to below as a scanner 1) will be described as an example of an image reading apparatus of the present disclosure. The scanner 1 is configured to read an image of a document while transporting the document.

Each drawing employs an orthogonal system, or an X-Y-Z coordinate system, in which the ±X directions correspond to width directions of the scanner 1, which intersect a document transport direction. When a document insertion opening 5 of the scanner 1 is viewed from the front, the +X direction corresponds to the right direction of the scanner 1, and the −X direction corresponds to the left direction of the scanner 1. Herein, the side in the −X direction (referred to below as the −X-directional side) is an example of a first-directional side, and the side in the +X direction (referred to below as the +X-directional side) is an example of a second-directional side. The +Y direction corresponds to the document transport direction in which the scanner 1 transports documents sequentially to read images of the documents. Hereinafter, the document transport direction is sometimes referred to as the downstream direction, and the opposite direction is sometimes referred to as the upstream direction. The +Y direction corresponds to the direction from the front to rear of the scanner 1, and the −Y direction corresponds to the direction from the front to rear of the scanner 1. When a document is inserted into the scanner 1 in the +Y direction, the scanner 1 transports this document in the +Y direction and then reads an image of the document. The ±Z directions correspond to the height directions of the scanner 1. Further, the +Z direction corresponds to the upward direction, and the −Z direction corresponds to the downward direction.

In this embodiment, the scanner 1 may be a portable, hand-held scanner. Hereinafter, the structures and locations of components constituting the scanner 1 will be described on the assumption that the scanner 1 is installed in the positions according to the individual drawings. However, it should be noted that the scanner 1 can be installed in any position during operation. Thus, the scanner 1 does not necessarily have to be installed in the positions according to the drawings, namely, with an upper surface 4a facing upwardly and a document transport route T1 (see FIG. 3) disposed horizontally.

Figure 2:
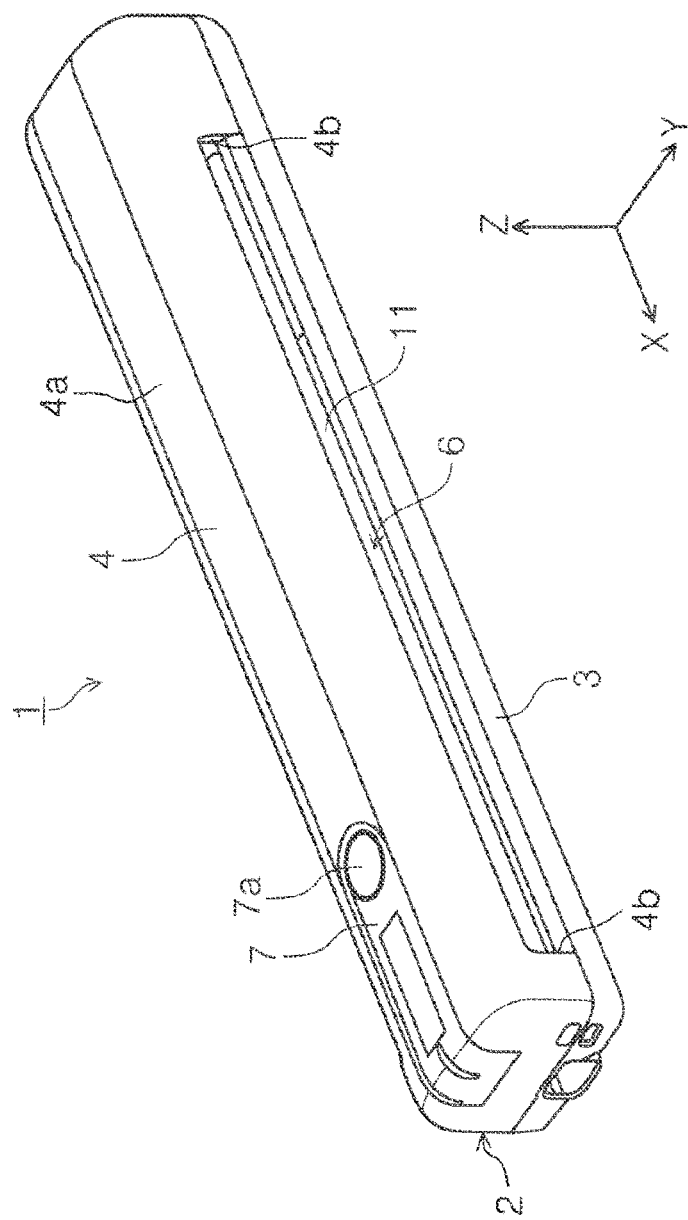
FIG. 2 is a rear perspective view of the scanner with the ejection guide removed.

As illustrated in FIGS. 1 and 2, the scanner 1 has a main body 2 that includes a lower housing 3 and an upper housing 4 as its outer shells. The main body 2 further includes an operation unit 7 on the upper surface 4a near the +X-directional side; the operation unit 7 includes: a scan button 7a to be operated by a user; and a display unit 7b that displays various information. The main body 2 further includes the document insertion opening 5 via which a document is to be inserted into the main body 2, the document insertion opening 5 being formed between a top frame 8 and a route-forming member 9. As illustrated in FIG. 2, a document ejection opening 6, via which a transport roller 11 is partly exposed, is formed between the lower housing 3 and the upper housing 4.

Figure 3:
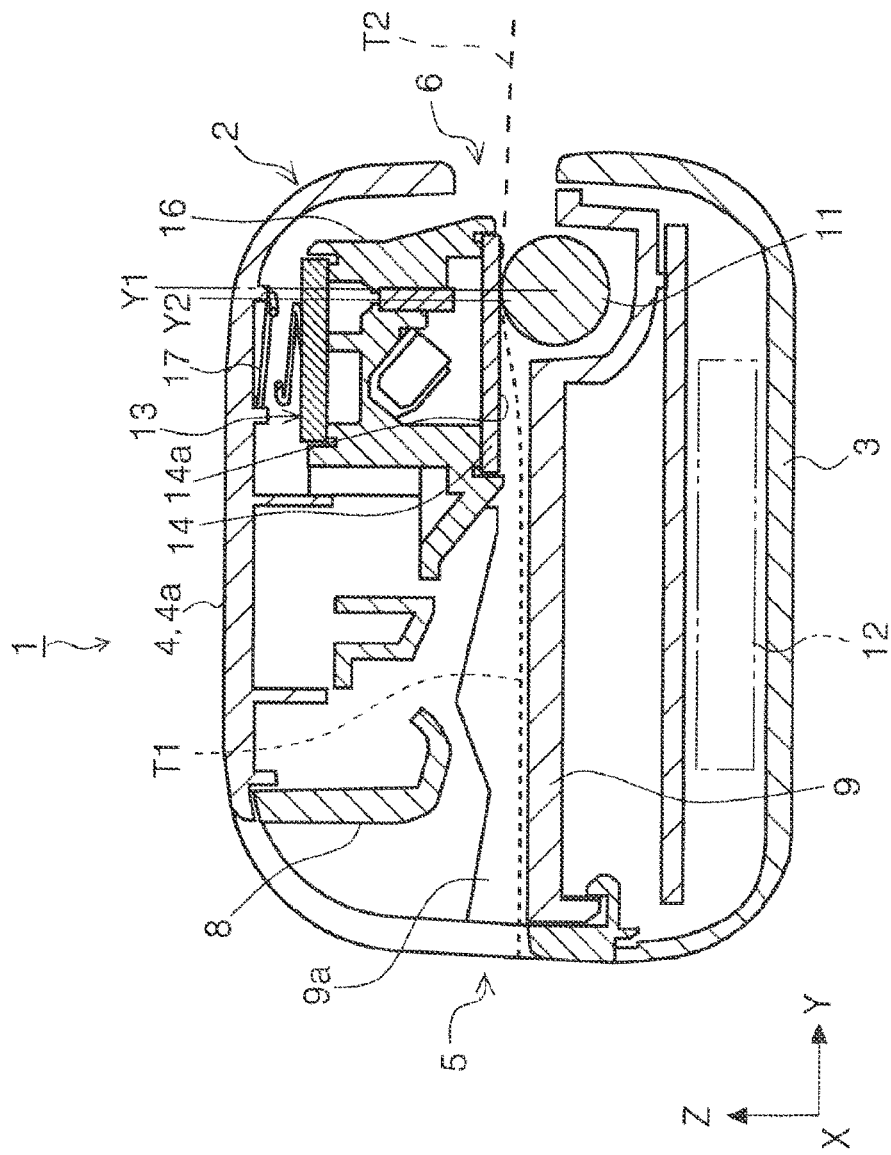
FIG. 3 illustrates a document transport route inside the scanner with the ejection guide removed.

As illustrated in FIG. 3, the lower side of the document transport route T1 along which documents are to be transported is defined by the route-forming member 9. The upper side of the document transport route T1 is defined by the top frame 8 and a sensor unit 13. A controller 12, which includes a plurality of electronic components mounted on a circuit board, is disposed below the route-forming member 9. The controller 12 controls operations of the scanner 1, such as transporting of documents, reading of images from the documents, and ejecting of the documents.

In FIG. 3, the broken line denoted by T1 indicates the document transport route, and the broken line denoted by T2 indicates a document ejection route; both of the document transport route T1 and the document ejection route T2 extend substantially horizontally. In this embodiment, the document transport route T1 extends from the document insertion opening 5 to a location Y1 (described later), and the document ejection route T2 extends in the downstream direction from the location Y1. When the user inserts a document into the main body 2 via the document insertion opening 5, the document is supported by the route-forming member 9 and is then nipped between the transport roller 11 and the sensor unit 13. In this case, the user may bring the side edge of the document in the −X direction into contact with an edge guide 9a, which is disposed inside the document insertion opening 5 near the −X-directional side of the main body 2. In this way, the user can precisely position the ±X-directional sides of the document.

After insertion of the document, when the document is nipped between the transport roller 11 and the sensor unit 13 or when the front edge of the document comes into contact with the transport roller 11, the user can sense that the document has reached the back side of the main body 2. The controller 12 then detects the insertion of the document in accordance with a detection signal from a detection sensor (not illustrated) disposed upstream of the transport roller 11. The controller 12 can read an image of the document in both a manual mode and an automatic mode.

When in the manual mode, the controller 12 slightly rotates the transport roller 11 in response to the detection of the insertion of the document, thereby causing a front portion of the document to be slightly nipped between the transport roller 11 and the sensor unit 13. In this case, the scanner 1 is kept in a read standby state. Then, when the user presses the scan button 7a, the controller 12 further rotates the transport roller 11 and reads the image of the document. When in the automatic mode, the controller 12 waits for a predetermined period after the detection of the insertion of the document. The controller 12 then rotates the transport roller 11 and reads the image of the document without waiting for the scan button 7a to be pressed.

In this embodiment, the sensor unit 13, which acts as a reader and may be implemented by a contact image sensor module (CISM), has a glass plate 14 with a read surface 14a below a frame 16 forming a base. The sensor unit 13 may be displaceable vertically so that documents having different thicknesses can be reliably nipped between the glass plate 14 and the transport roller 11.

Figure 4:
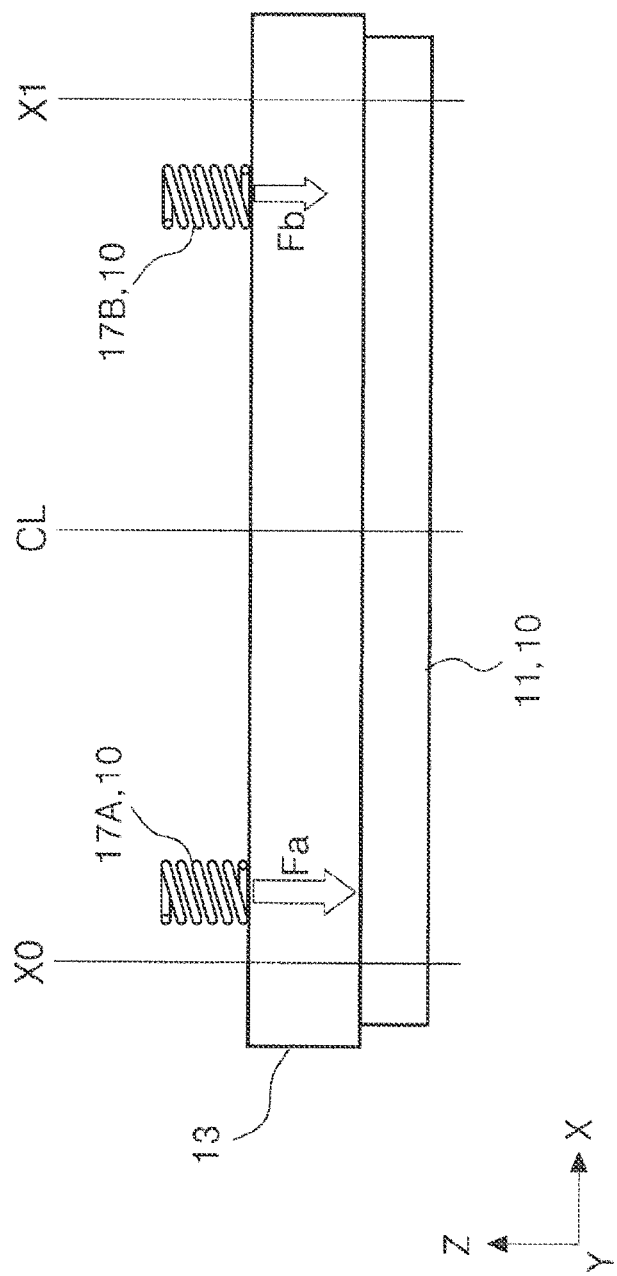
FIG. 4 illustrates the sensor unit and the transport roller in the scanner as viewed from the upstream side in a document transport direction.
Figure 5:
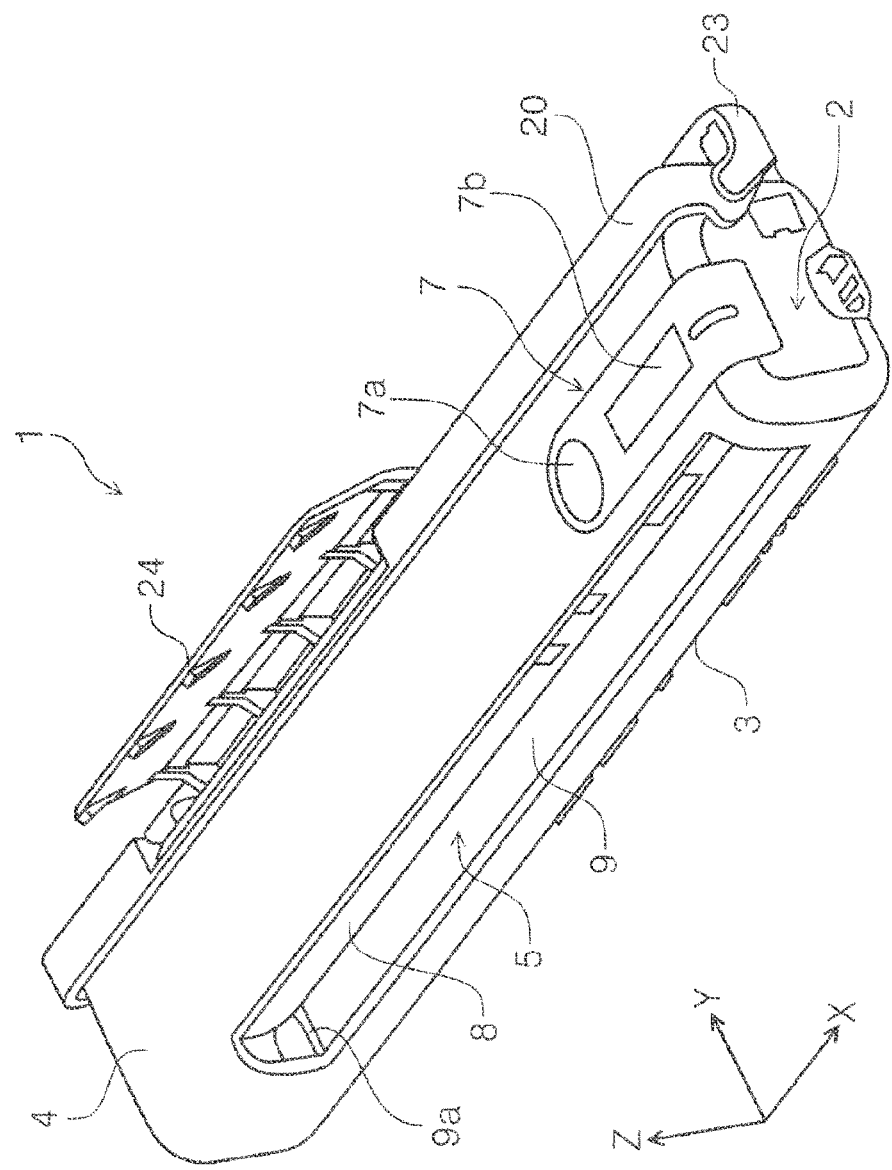
FIG. 5 is a front perspective view of the scanner in a first state with the ejection guide attached.

As illustrated in FIGS. 3 and 4, compression springs 17, which are an example of a pressing member that generates a pressing force, are disposed above the sensor unit 13 and below the upper housing 4. As illustrated in FIG. 4, two compression springs 17 are arranged a predetermined distance apart from each other in the +X direction. In FIG. 4, the compression spring 17 on the −X-directional side is denoted by 17A, and the compression spring 17 on the +X-directional side is denoted by 17B. Further, the compression spring 17A is an example of a first pressing member, and the compression spring 17B is an example of a second pressing member. Both of the compression springs 17A and 17B urge the sensor unit 13 downward to press the glass plate 14 (see FIG. 3) against the transport roller 11, thereby helping the document to be reliably nipped between the glass plate 14 and the transport roller 11 and also helping the transport roller 11 to transfer its transport force to the document. In this case, the transport roller 11 and the compression springs 17A and 17B constitute a transport-force-applying mechanism 10 that applies the transport force to the document.

In FIG. 4, a location X0 corresponds to the location of the side edge of a document being guided by the edge guide 9a (see FIG. 1). In other words, the location X0 corresponds to the site through which the side edge of a document having any given size in the −X direction passes, or the site through which the side edge of the read area of the document in the −X direction passes. A location X1 corresponds to the location of the side edge of the read area of the document in the +X direction. A central location CL corresponds to the central location between the locations X0 and X1. The compression springs 17A and 17B are arranged symmetrically with respect to the central location CL.

In general, the sensor unit 13 tends to be warped in the +X direction during a manufacturing process. Therefore, the vertical length of the portion of the document transport route T1 which faces the sensor unit 13 tends to decrease toward the −X-directional side. When a document is transported along the document transport route T1, the transport load placed on the area of the document on the −X-directional side with respect to the central location CL (see FIG. 4) is heavier than the transport load placed on the area of the document on the +X-directional side. This may excessively reduce the transport force applied to the area of the document on the −X-directional side with respect to the central location CL, thereby skewing the document. For this reason, in this embodiment, a spring force Fa generated by the compression spring 17A is set to be greater than a spring force Fb generated by the compression spring 17B. In short, the transport force applied by the transport-force-applying mechanism 10 to the −X directional side (first side) of the document is set to be greater than the transport force applied to the +X-directional side (second side) of the document. In this embodiment, the transport force applied by the transport-force-applying mechanism 10 to a document is adjusted by varying the difference in spring force between the compression springs 17A and 17B. In this way, the transport force generated by the transport-force-applying mechanism 10 can be adjusted with a simple configuration. In this embodiment, two compression springs 17 are arranged on the ±X-directional sides with respect to the central location CL. However, the number of compression springs 17 is not limited. Alternatively, any other number of compression springs 17 may be arranged as long as the total transport force applied to the −X-directional side of the document is greater than the total transport force applied to the +X-directional side of the document.

As illustrated in FIG. 3, the location Y1 corresponds to the rotational center of the transport roller 11 in the +Y direction and also to the center of the contact area between the transport roller 11 and the glass plate 14. A location Y2 corresponds to the location in the +Y direction at which the sensor unit 13 reads a document. As can be seen from FIG. 3, the location Y2 is slightly upstream of the location Y1. This configuration suppresses external light that has entered the main body 2 through the document ejection opening 6 from affecting the reading performance of the sensor unit 13.

The transport roller 11 includes: a metal shaft; and an elastic material, such as an elastomer, disposed around the metal shaft. When the transport roller 11 makes contact with the glass plate 14, the contact area of the elastic material is flattened. This flattened area has a predetermined length, such as about 1 mm, in the document transport direction. The location Y2 is in the contact area between the flattened portion of the transport roller 11 and the glass plate 14. After the sensor unit 13 has read the document, the transport roller 11 rotates to feed the document backward along the document ejection route T2, thereby ejecting the document from the rear of the main body 2 to the outside via the document ejection opening 6.

Figure 11:
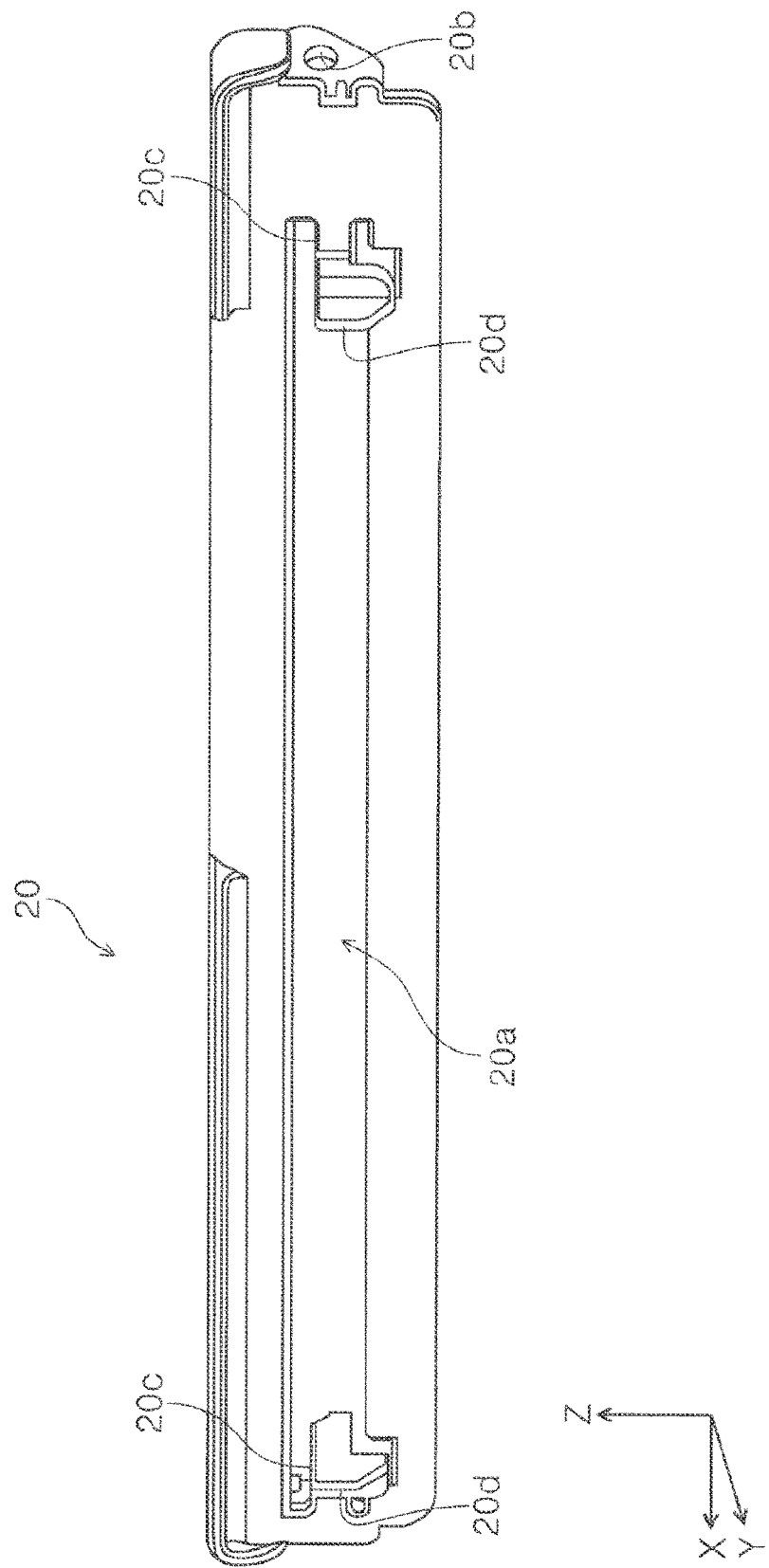
FIG. 11 is a perspective view of the mounting adapter.
Figure 12:
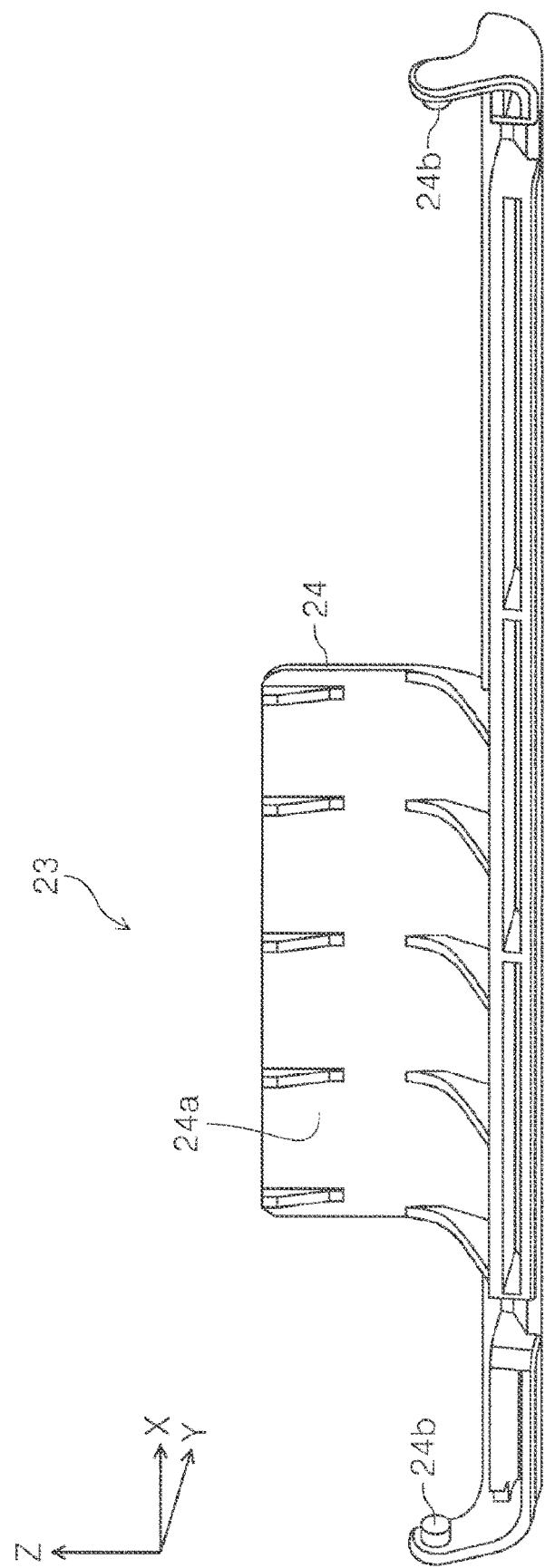
FIG. 12 is a perspective view of the guide member.

Next, a description will be given below of an ejection guide 24 that upwardly guides the document being fed after a document has been ejected from the document transport route T1 to the outside. In FIGS. 5 to 8, the ejection guide 24 is removable from the main body 2. The ejection guide 24 is a section of the guide member 23, which is removable from the mounting adapter 20. As illustrated in FIG. 12, the guide member 23 extends in the +X direction and has shafts 24$b$ (see FIG. 10) at both the ±X-directional ends. As illustrated in FIG. 11, the mounting adapter 20 extends in the +X direction and has fitting holes 20$b$ at the ±X-directional ends. It should be noted that the fitting hole 20$b$ on the +X-directional side is not illustrated in FIG. 11.

By inserting the shafts 24$b$ of the guide member 23 into the corresponding fitting holes 20$b$ of the mounting adapter 20, the guide member 23 can be supported by the mounting adapter 20 so as to be rotatable around an axis extending in the X direction and within the Y-Z plane. The guide member 23, which may be made of a resin material, is slightly elastically deformable as a whole in the ±X directions so that the shafts 24$b$ can be inserted into the corresponding fitting holes 20$b$.

Figure 13:
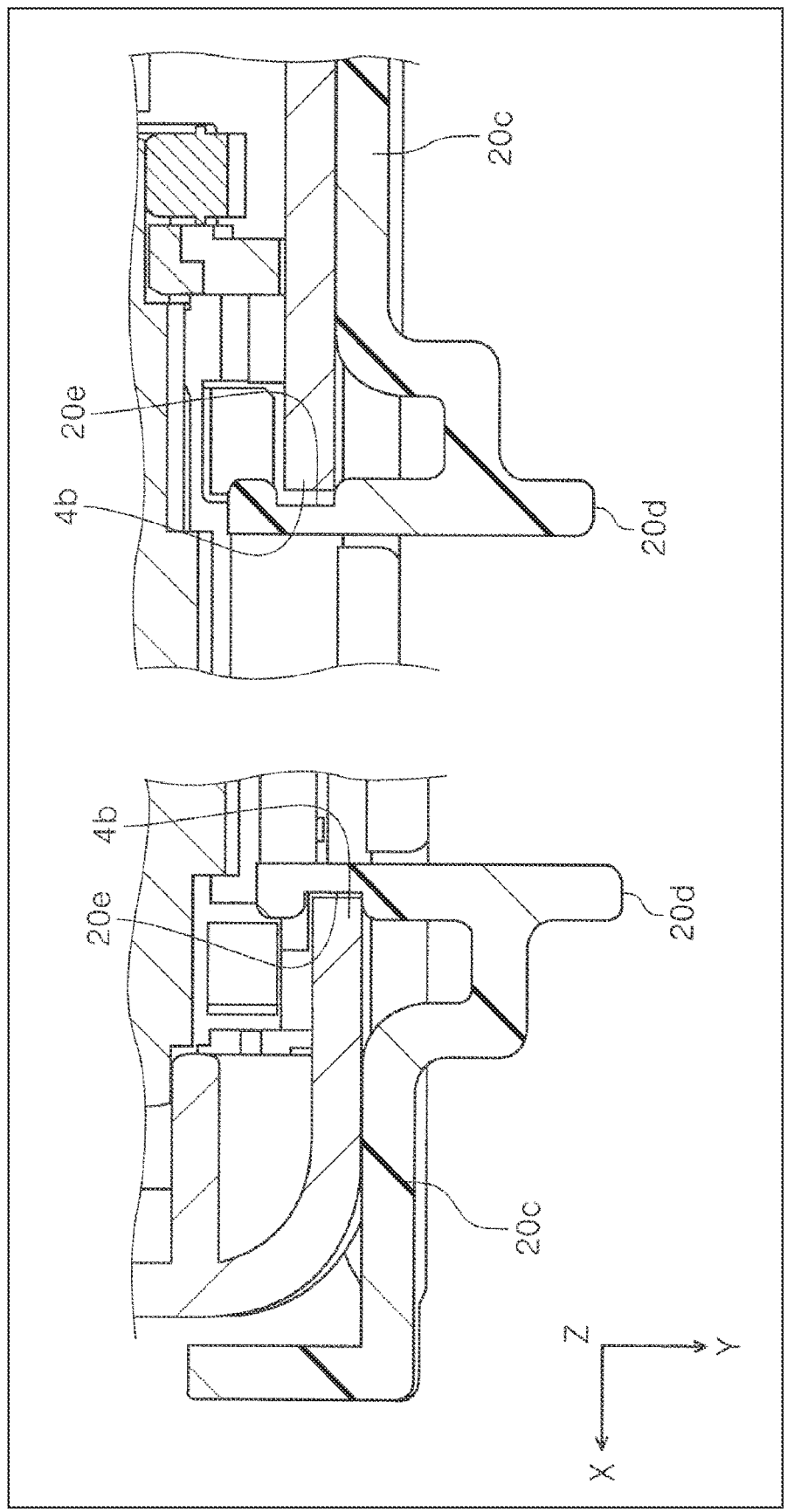
FIG. 13 is a cross-sectional view of the sections of the main body to which the mounting adapter is fixed.

The mounting adapter 20, which may also be made of a resin material, has an overall frame shape with an aperture 20$a$ expanding in the ±X directions. Hereinafter, of the ±X directions, a direction toward the center of the aperture 20$a$ is sometimes referred to as an inward direction, and a direction away from the center of the aperture 20$a$ is sometimes referred to as an outward direction. As illustrated in FIG. 13, arms 20$c$, which extend in the inward directions and each of which includes a knob 20$d$ extending in the +Y direction and a recess 20$e$ on the opposite side (−Y-directional side) of the knob 20$d$, are formed adjacent to the aperture 20$a$ in the ±X directions.

The recesses 20$e$ mate with respective sides 4$b$ (see FIG. 2) adjacent to the document ejection opening 6 in the ±X directions. The recesses 20$e$ mate with the corresponding sides 4$b$ so that the mounting adapter 20 is fixed to the upper housing 4, or mates with the main body 2. The arms 20$c$ may be elastically deformable, in which case the recesses 20$e$ can be detached from the sides 4$b$ by pressing the knobs 20$d$ in the outward directions.

Figure 6:
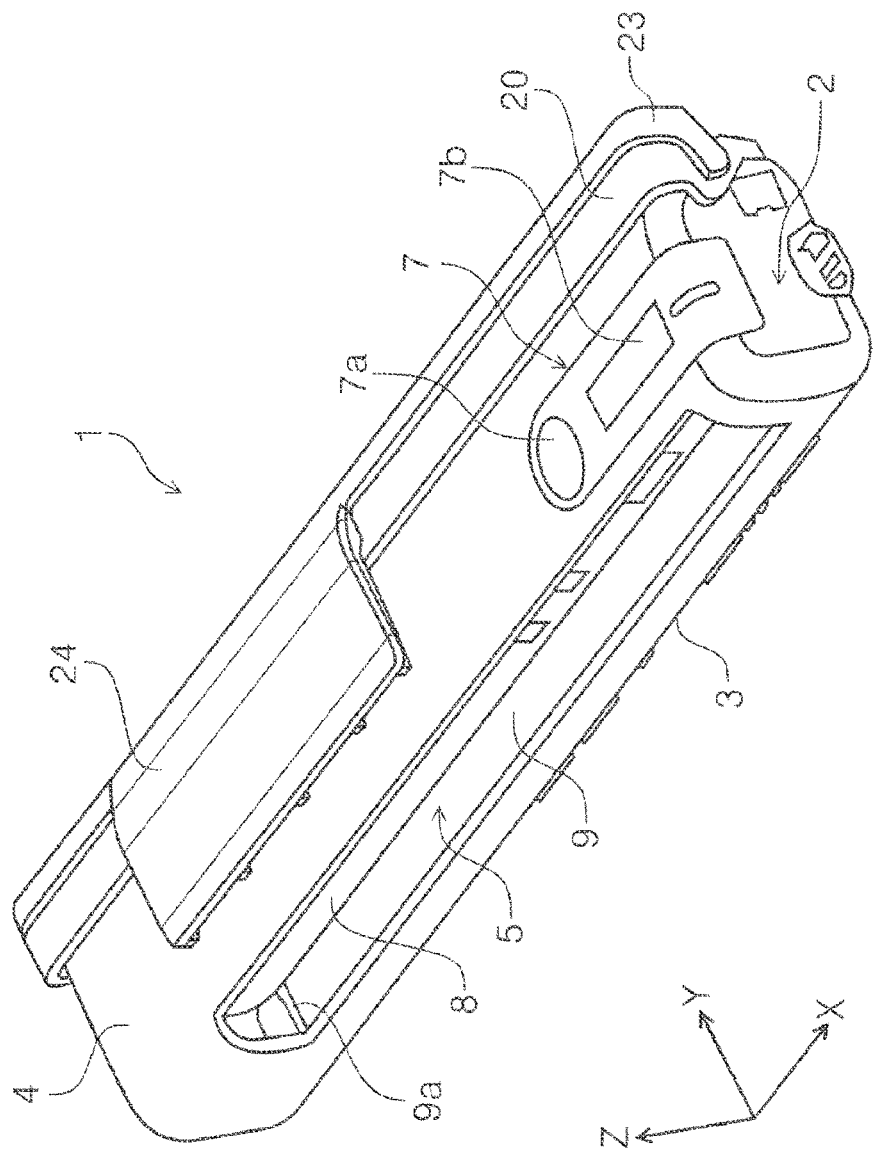
FIG. 6 is a front perspective view of the scanner in a second state with the ejection guide attached.
Figure 7:
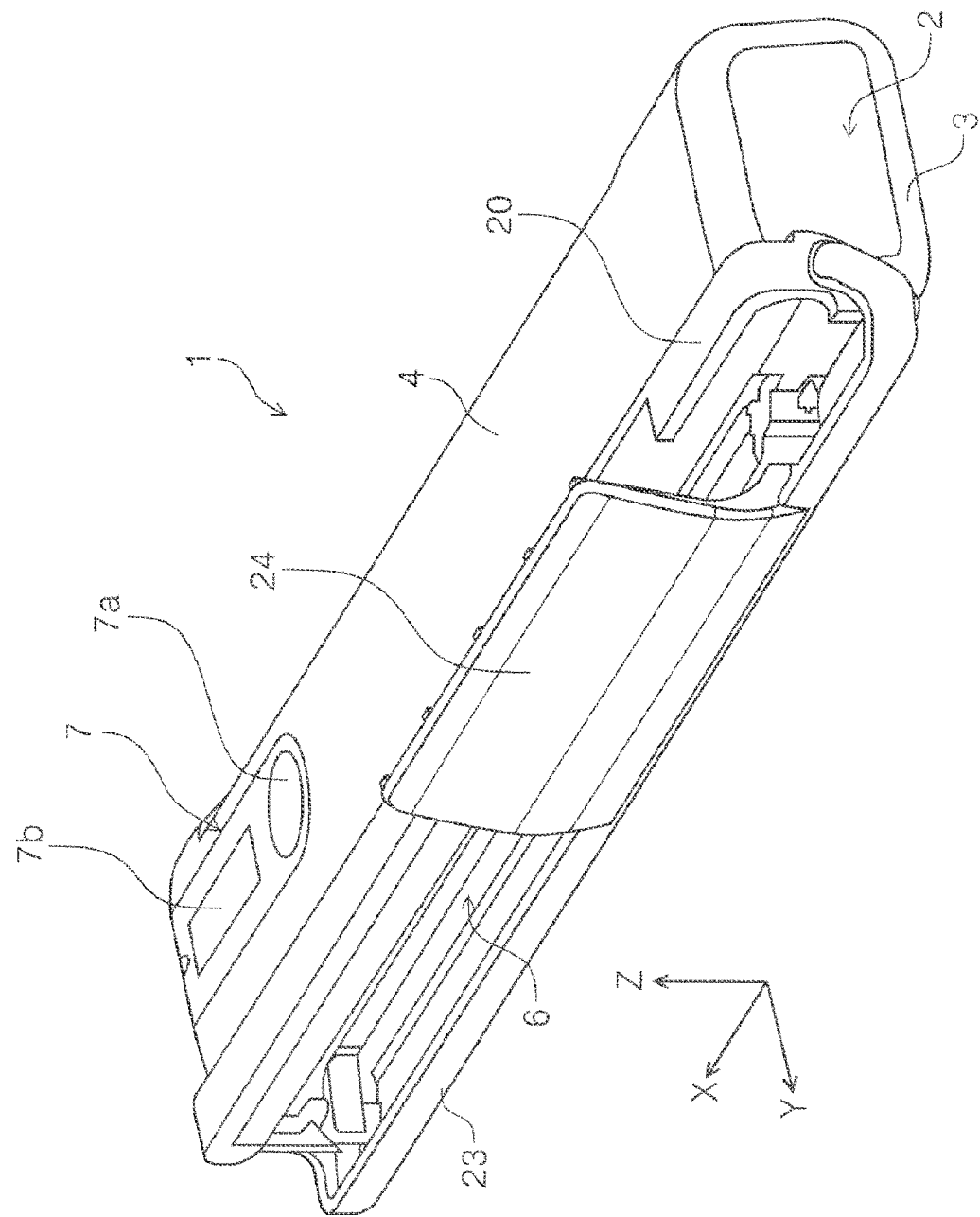
FIG. 7 is a rear perspective view of the scanner in the first state with the ejection guide attached.
Figure 8:
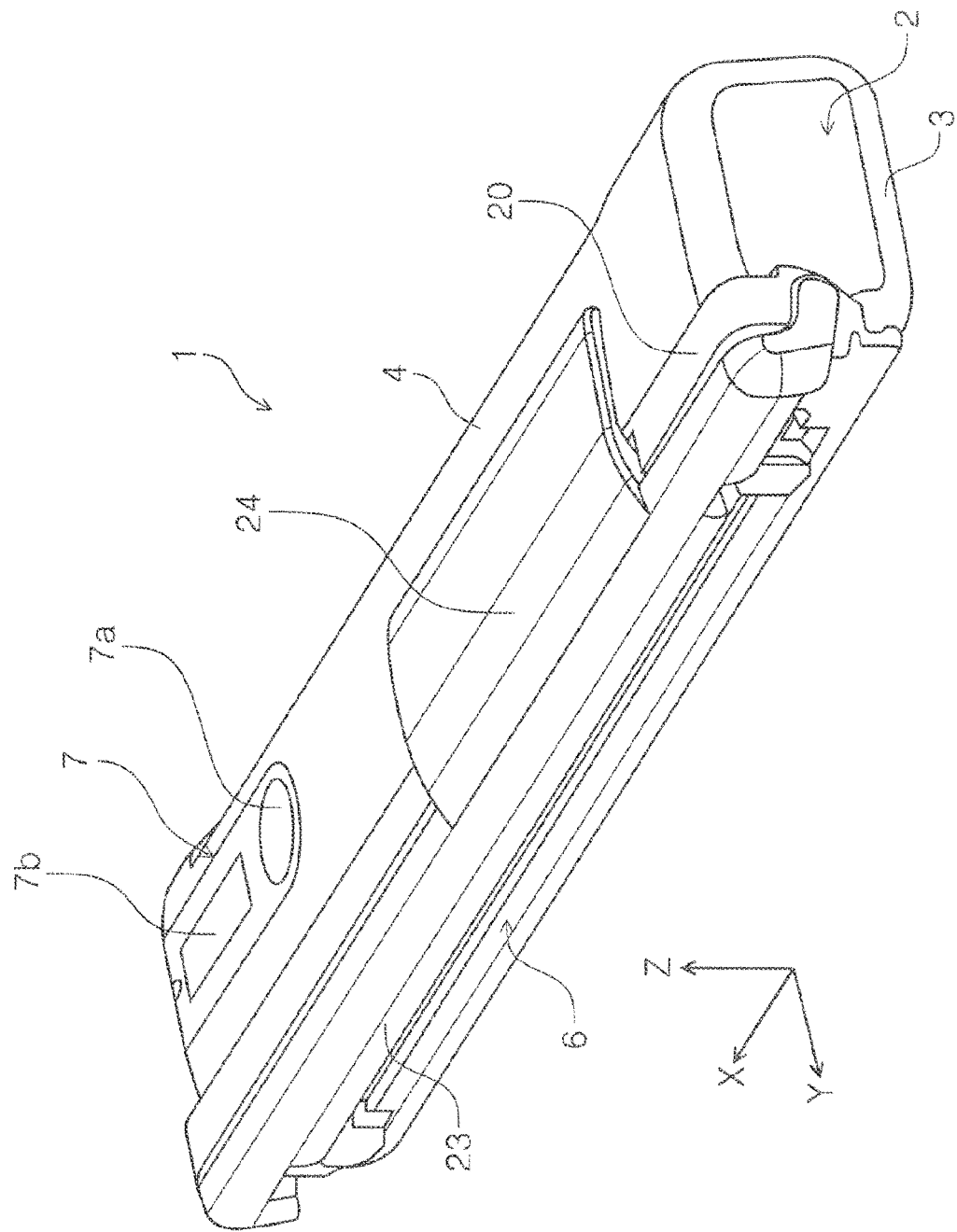
FIG. 8 is a rear perspective view of the scanner in the second state with the ejection guide attached.
Figure 9:
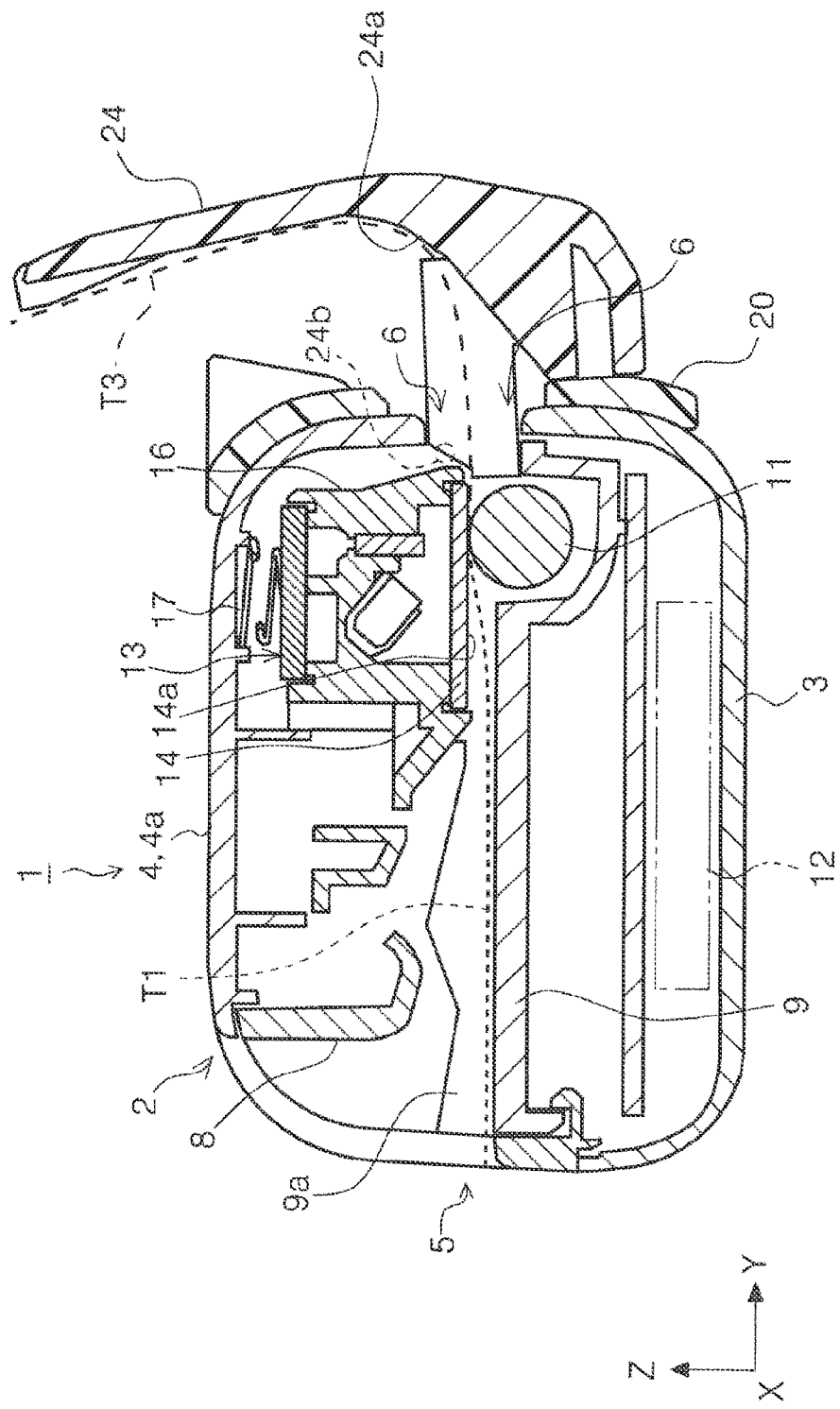
FIG. 9 illustrates the document transport route inside the scanner in the first state with the ejection guide attached.
Figure 10:
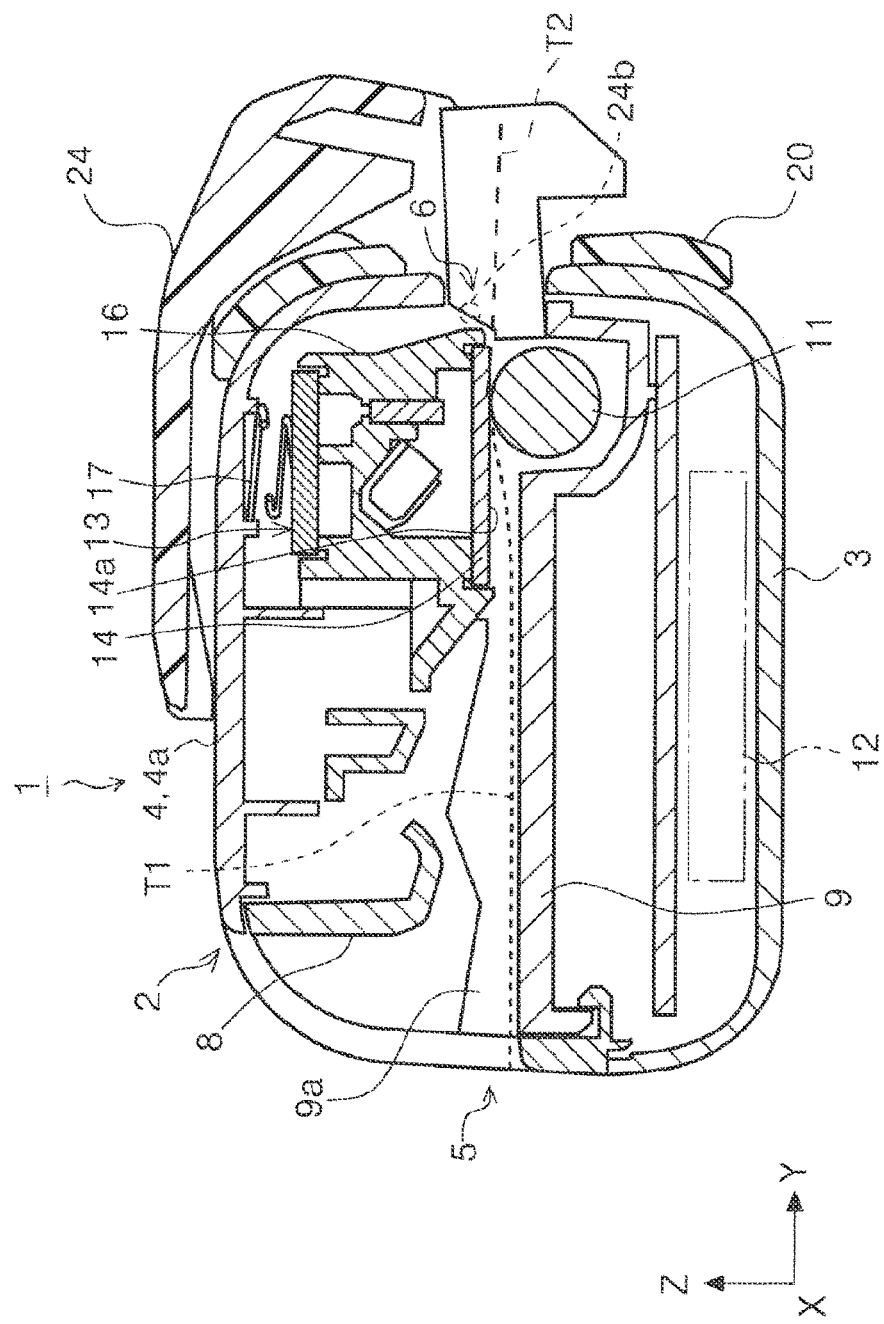
FIG. 10 illustrates the document transport route inside the scanner in the second state with the ejection guide attached.

The guide member 23, or the ejection guide 24, can be rotated to switch between a first state (FIGS. 5, 7, and 9) and a second state (FIGS. 6, 8, and 10). The first state (FIGS. 5, 7, and 9) is also referred to as the use state of the ejection guide 24, and the second state (FIGS. 6, 8, and 10) is referred to as the accommodated state of the ejection guide 24.

Figure 14:
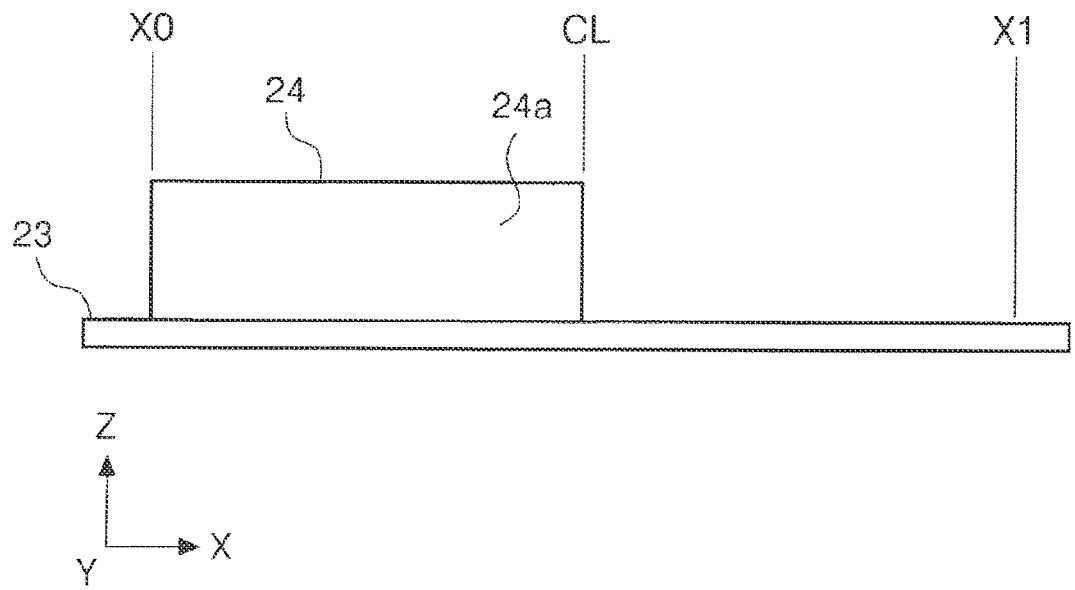
FIG. 14 illustrates the ejection guide as viewed from the upstream side in the document transport direction.

In this embodiment, as schematically illustrated in FIG. 14, the ejection guide 24 is positioned asymmetrically toward the −X-directional side. In other words, the ejection guide 24 occupies a larger area on the −X-directional side than on the +X-directional side with respect to the central location CL. In this embodiment, the ejection guide 24 is not disposed between the central location CL and the +X-directional side.

When the ejection guide 24 is in the first state as illustrated in FIG. 9, after a document has been ejected via the document ejection opening 6, the leading edge of the document comes into contact with the ejection guide 24. The document is then upwardly guided over a guide surface 24$a$. Next, the document is inverted and then fed in the −Y direction. In FIG. 9, T3 denotes a document guide route formed by the ejection guide 24. In this case, the guide surface 24$a$ is not limited to being formed such that a document being upwardly guided is inverted and fed in the −Y direction. By attaching the ejection guide 24 to the main body 2 and setting the ejection guide 24 to the first state in this manner, the space behind the main body 2 to which documents are to be ejected, namely, an installation space of the scanner 1, can be decreased.

As described with reference to FIG. 4, the transport force applied by the transport-force-applying mechanism 10 to the −X-directional side of a document is greater than the transport force applied to the +X-directional side of the document. Moreover, the ejection guide 24 is positioned asymmetrically toward the −X-directional side. In this case, the load placed by the ejection guide 24 on the −X-directional side of a document is heavier than the load placed on the +X-directional side of the document, to which the transport-force-applying mechanism 10 may fail to sufficiently apply the transport force. This configuration reduces the risk of a transport force being insufficiently applied to the +X-direction side of a document, thereby suppressing distortion of read images.

In this embodiment, the ejection guide 24 is disposed only within the area between the central location CL and the −X-directional side, thereby more reliably producing the above effect.

In this embodiment, it can be said that the length of the document guide route T3 formed by the ejection guide 24, namely, the length of the guide surface 24$a$ along the document transport route, is shorter on the +X-directional side than on the −X-directional side with respect to the central location CL. Note that, if the +X-directional side of the guide surface 24$a$ with respect to the central location CL is shorter than the −X-directional side of the guide surface 24$a$, of the ejection guide 24 along which the document is guided, the area between the central location CL and the +X-directional side is smaller than the area between the −X-directional side and the central location CL. For example, the area of the guide surface 24$a$ between the central location CL and the +X-directional side may be set to zero, as in this embodiment.

Figure 15:
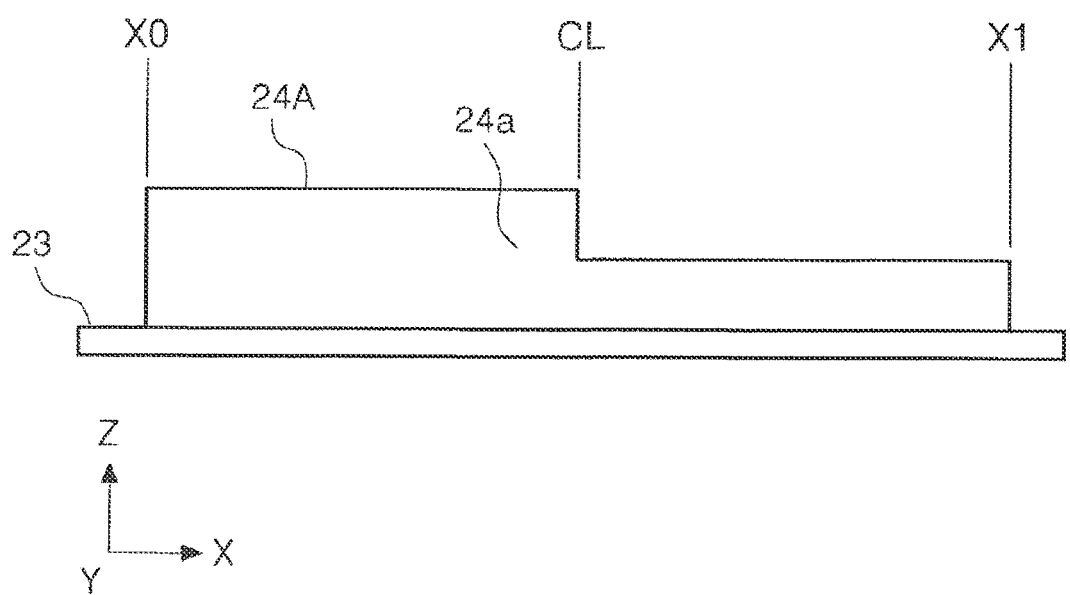
FIG. 15 illustrates an ejection guide according to another embodiment.
Figure 16:
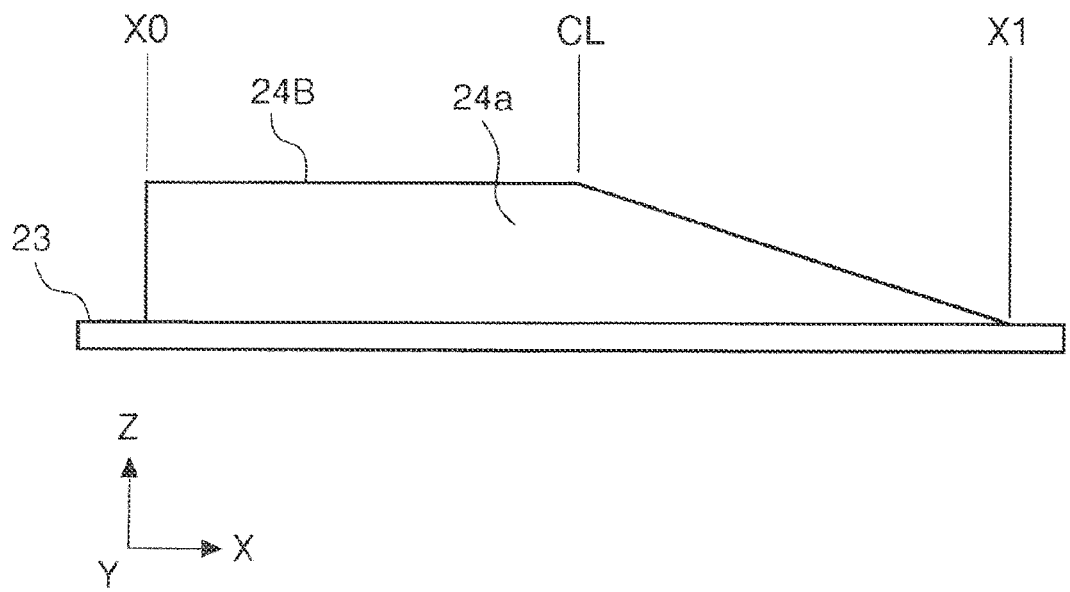
FIG. 16 illustrates an ejection guide according to another embodiment.
Figure 17:
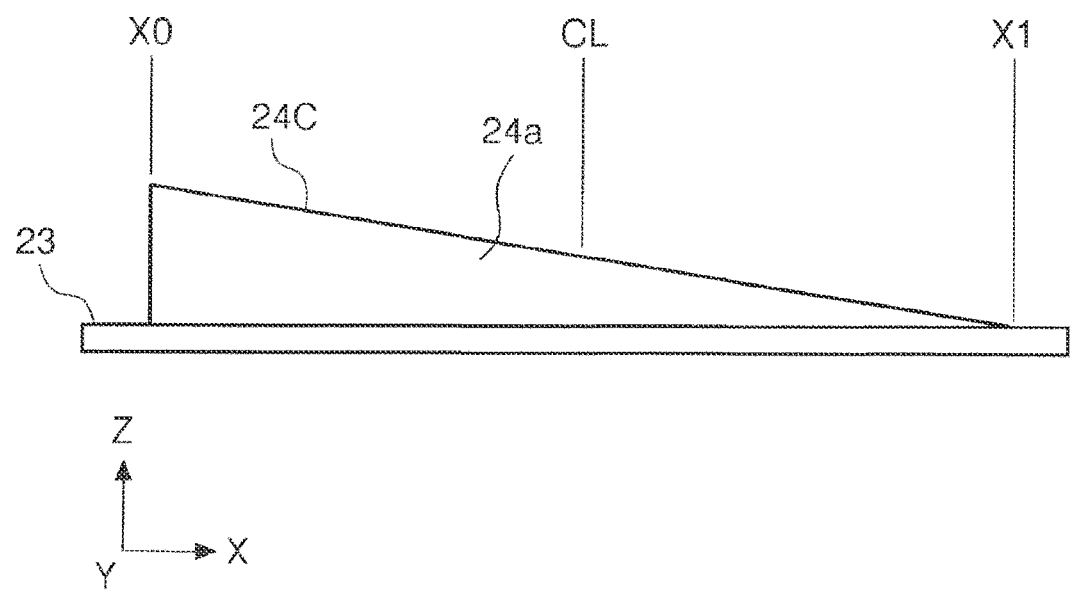
FIG. 17 illustrates an ejection guide according to another embodiment.

In another embodiment, as illustrated in FIG. 15, a guide surface 24$a$ of an ejection guide 24A may have a predetermined length along the document transport route within the region between the central location CL and the +X-directional side. In still another embodiment, as illustrated in FIG. 16, a guide surface 24$a$ of an ejection guide 24B may have a length along the document transport route which decreases from the central location CL toward the +X-directional side. In yet another embodiment, as illustrated in FIG. 17, a guide surface 24$a$ of an ejection guide 24C may have a length along the document transport route which decreases from the −X-directional side toward the +X-directional side.

In the foregoing embodiment, it can be said that the transport load placed by the ejection guide 24 on the −X direction side of the document with respect to the central location CL is heavier than the transport load placed on the +X direction side of the document.

Figure 18:
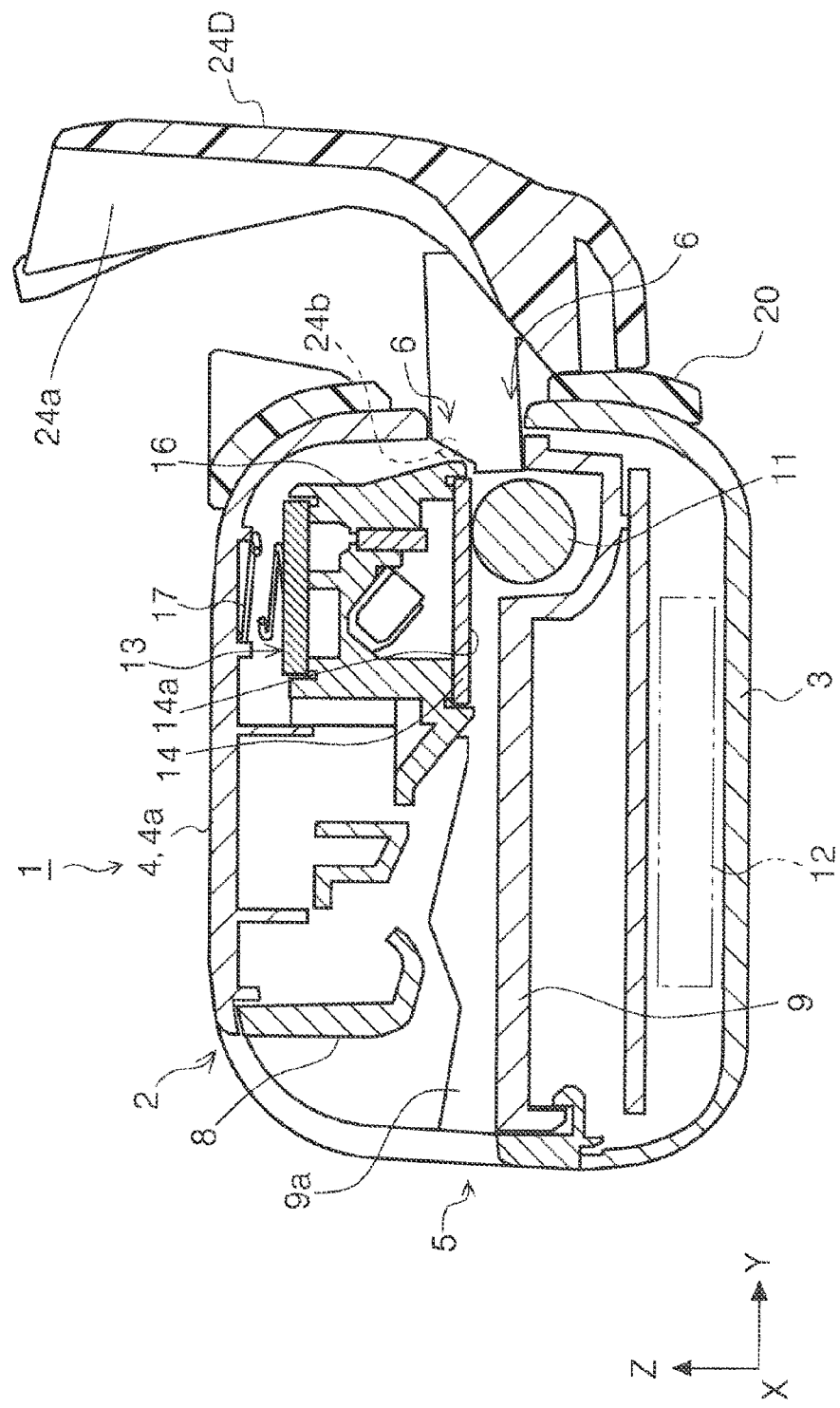
FIG. 18 illustrates a document transport route inside a scanner to which an ejection guide according to another embodiment is attached.

In a further embodiment, as illustrated in FIG. 18, a guide surface 24$a$ of an ejection guide 24D may be inclined less abruptly from the −X-directional side toward the +X-directional side. By inclining the guide surface 24$a$ in this manner, the curvature at which a document is inverted is decreased from the −X-directional side toward the +X-directional side. This configuration enables the ejection guide 24D to place a heavier transport load on the −X direction side of a document than on the +X-directional side of the document with respect to the central location CL.

Figure 19:
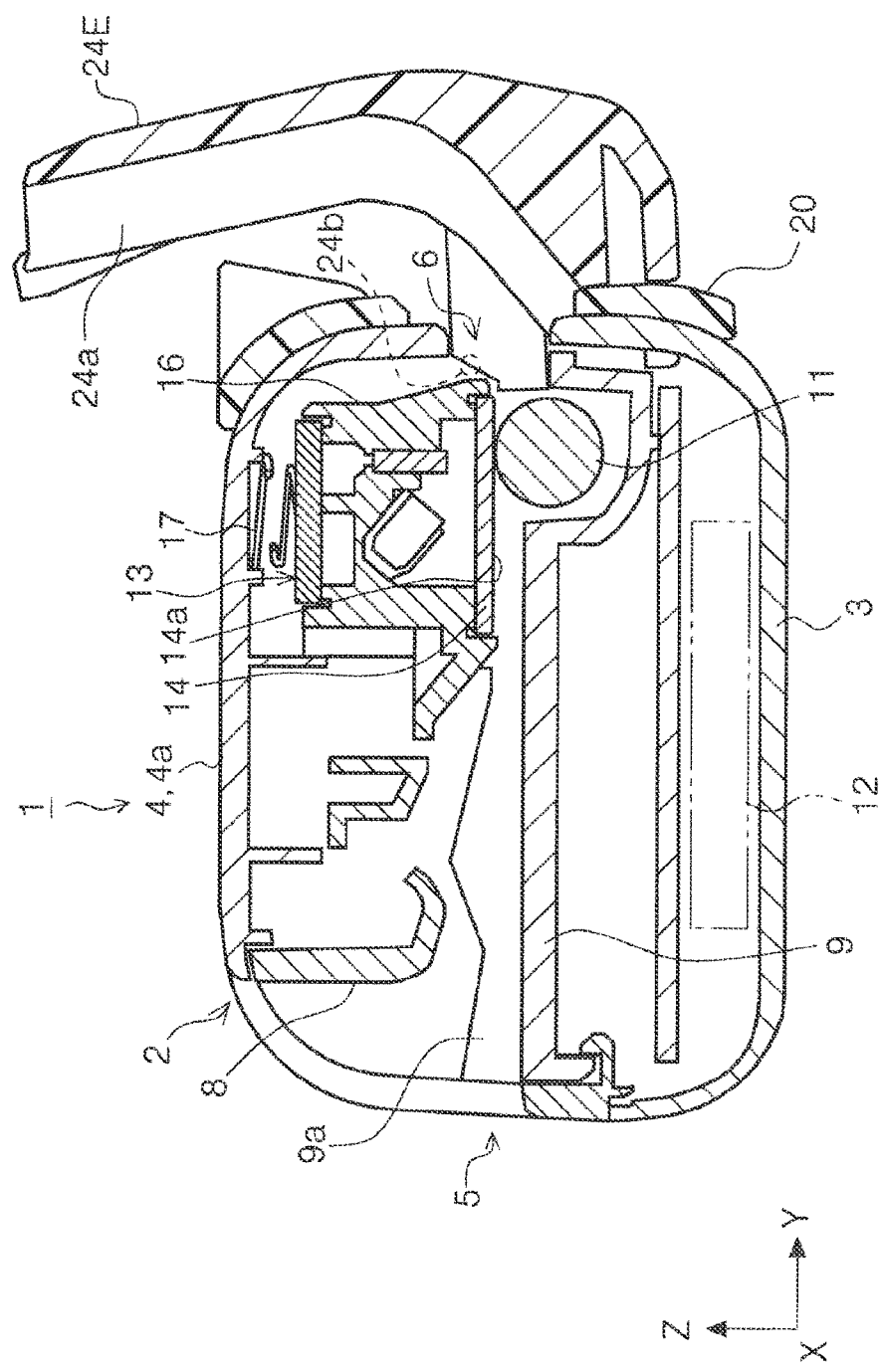
FIG. 19 illustrates a document transport route inside a scanner to which an ejection guide according to another embodiment is attached.

As illustrated in FIG. 19, a guide surface 24a of an ejection guide 24E may be formed such that the distance between the guide surface 24a and a document ejection opening 6 increases from the −X-directional side toward the +X-directional side. This configuration also enables the ejection guide 24E to place a heavier transport load on the −X-directional side of a document than on the +X-directional side of the document with respect to the central location CL.

In the foregoing embodiment, the ejection guide 24 is removable from the main body 2, which enables the user to remove the ejection guide 24 from the main body 2 when not using the ejection guide 24. Accordingly, it is possible to decrease the installation space of the main body 2, thus providing the user with good usability. Alternatively, the ejection guide 24 may be integrated with the main body 2, in which case the ejection guide 24 acts as a cover that covers an upper portion of the main body 2.

In the foregoing embodiment, the ejection guide 24 is switchable between the first state where an ejected document is to be upwardly guided and the second state where the ratio of the projected area to the footprint of the main body 2 becomes smaller than the ratio in the first state. This configuration enables the user to set the ejection guide 24 to the second state without having to remove the ejection guide 24 from the main body 2. Accordingly, it is possible to decrease the installation space of the main body 2, thus providing the user with good usability.

In the foregoing embodiment, the ejection guide 24, when in the second state, is supported on the upper surface 4a of the scanner 1. This configuration can support the ejection guide 24 in the second state without using an additional component, thereby leading to a decreased overall cost.

As can be seen from FIG. 6 or 8, the ejection guide 24, when in the second state, is disposed outside the operation unit 7. This configuration enables the user to operate the operation unit 7 without being hindered by the ejection guide 24 even when the ejection guide 24 is in the second state.

As can be seen from FIG. 10, the ejection guide 24, when in the second state, is positioned so as not to make contact with a document that has been ejected backward from the document transport route T1 to the outside of the main body 2 and exposes the document ejection route T2. Thus, even when the ejection guide 24 is attached to the main body 2 and set to the second state, the scanner 1 can reliably read images of documents, thereby providing the user with good usability.

Examples of small documents are cash cards, credit cards, and other plastic cards, the sizes of which are specified by international specifications ISO/IEC7810, for example. Hereinafter, documents having this size are referred to as card-sized documents. For example, a card-sized document is 53.98×85.60 mm. If the distance between the locations X0 and X1 in FIG. 4 is about 210 mm, which is equivalent to the length of the short side of an A4 sheet, or about 216 mm, which is equivalent to the length of the short side of a letter sheet, for example, when a card-sized document is transported, the card-sized document can reliably pass through the area between the location X0 and the central location CL in FIG. 14 regardless of the orientation of the card-sized document placed.

Figure 20:
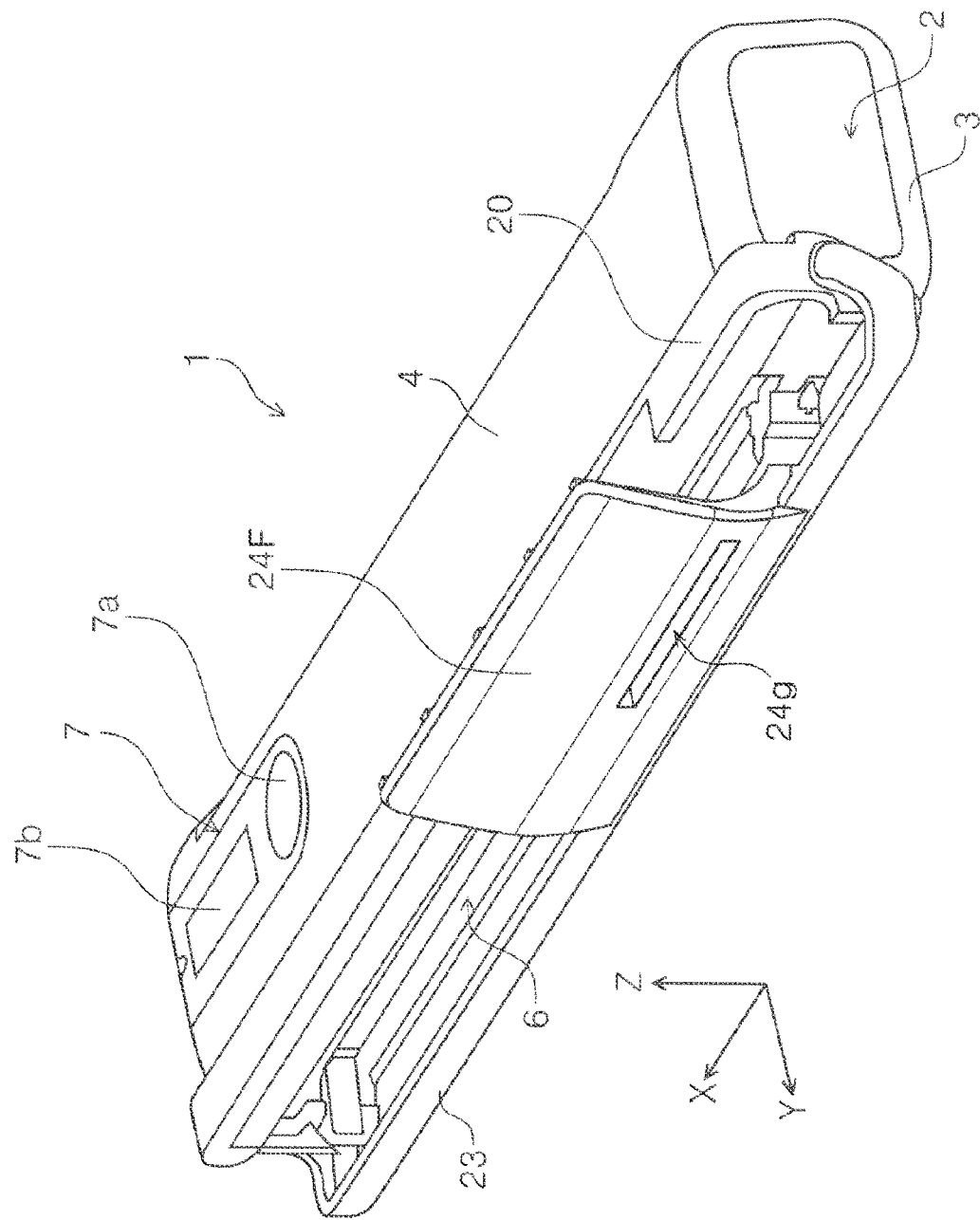
FIG. 20 is a rear perspective view of a scanner in a first state where the ejection guide according to another embodiment is attached.
Figure 21:
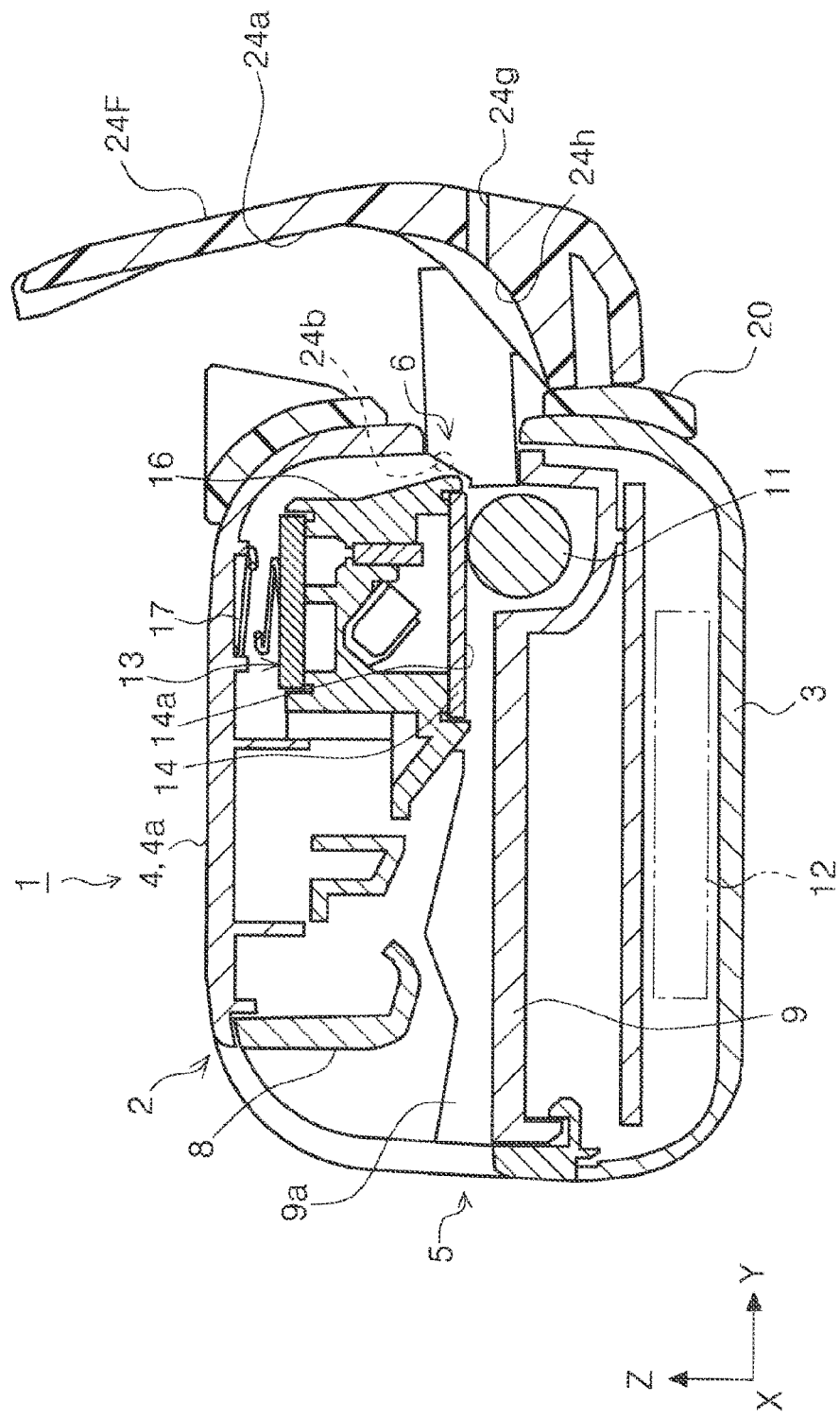
FIG. 21 illustrates a document transport route inside a scanner to which an ejection guide according to another embodiment is attached.

In the above scenario, some scanners may fail to invert card-sized documents over the ejection guide 24 due to their rigidity. For this reason, as illustrated in FIG. 20 or 21, the ejection guide 24F may be provided with a document through-hole 24g via which card-sized documents are to be ejected backward to the outside. Thus, even when the ejection guide 24F is attached to a main body 2 and kept in the first state, the scanner 1 can reliably read images of card-sized documents, thereby providing the user with good usability. As illustrated in FIG. 21, the document through-hole 24g is formed in a recess 24h on a guide surface 24a. This configuration reduces the risk of the document jamming inside the document through-hole 24g when a document larger than a card-sized document is upwardly fed over a guide surface 24a.

In the foregoing embodiment, the scanner 1 applies the transport force to a document by nipping the document between the sensor unit 13 and the transport roller 11. As illustrated in FIG. 22, however, the scanner 1 may have a plurality of rollers arranged side by side in the +X direction and may apply the transport force to a document by nipping the document therebetween. In FIG. 22, reference 13A denotes a first sensor unit, which acts as a first reader, and reference 13B denotes a second sensor unit, which acts as a second reader. Both of the first sensor unit 13A and the second sensor unit 13B can read the respective surfaces of the document when a document passes through the area between the first sensor unit 13A and the second sensor unit 13B. The first sensor unit 13A is movable toward or away from the second sensor unit 13B and is pressed against the second sensor unit 13B by a pressing member (not illustrated).

In FIG. 22, references 30A and 30B denote transport roller pairs, both of which are disposed on the document transport route and the upstream side of the first sensor unit 13A and the second sensor unit 13B. Each of the transport roller pairs 30A and 30B nips a document being transported. FIG. 22 illustrates the transport roller pairs 30A and 30B, the first sensor unit 13A, and the second sensor unit 13B as viewed from the upstream side.

Each of the transport roller pairs 30A and 30B includes: a drive roller 31 that is rotated by a motor (not illustrated); and a driven roller 32 that rotates in conjunction with the drive roller 31, both the drive roller 31 and the driven roller 32 being arranged side by side in the +X direction so as to be symmetrical to each other with respect to the central location CL. The driven rollers 32 are disposed so as to be movable toward or away from the corresponding drive rollers 31. In FIG. 22, reference 33A denotes a compression spring that presses the driven roller 32 toward the drive roller 31 in the transport roller pair 30A. Moreover, reference 33B denotes a compression spring that presses the driven roller 32 toward the drive roller 31 in the transport roller pair 30B. In this case, the compression spring 33A acts as a first pressing member, and the compression spring 33B acts as a second pressing member. The transport roller pairs 30A and 30B and the compression springs 33A and 33B constitute a transport-force-applying mechanism 34 for applying the transport force to a document.

The first sensor unit 13A and the second sensor unit 13B, which nip a document being transported therebetween, each tend to be warped in the X direction axis during a manufacturing process. In such a case, the scanner 1 may place a heavier transport load on the area of a document between the −X-directional side and the central location CL than on the area of the document between the central location CL and the +X-directional side. As a result, the transport force applied to the area of the document between the −X-direction side and the central location CL might become insufficient, thereby skewing the document. For this reason, a spring force Fa generated by the compression spring 33A is set to be greater than a spring force Fb generated by the compression spring 33B. In other words, the transport-force-applying mechanism 34 applies a greater transport force to the −X-directional side of a document than on the +X-directional side of the document; the −X-directional side is an example of the first-directional side, and the +X-directional side is an example of the second-directional side. This configuration successfully reduces the risk of a resultant read image being distorted due to an insufficient transport force being applied to the +X-directional side even when the ejection guide 24 is attached to the main body 2.

In the foregoing embodiments, it is possible to reduce the risk of documents skewing, thereby suppressing distortion of read images, even when the ejection guide 24 is attached to the main body 2. In addition, the scanner 1 optionally performs a distortion correction process on read images. For example, if the +X-directional side of a document with respect to the central location CL is transported at a lower speed than the −X-directional side of the document is, due to attaching of the ejection guide 24, the +X-directional side of a resultant read image may be excessively expanded in the transport direction. Therefore, the scanner 1 may shrink the expanded side of the read image by performing the distortion correction process.

The present disclosure is not limited to the foregoing embodiments and may be modified in various ways within the scopes of the claims. Obviously, such modifications remain within the scope of the present disclosure.

What is claimed is:

1. An image reading apparatus, comprising:
a document transport route along which a document inserted into the image reading apparatus from a front side is transported backward;
a reader that reads an image of the document, the reader being disposed on the document transport route;
an ejection guide that upwardly guides the document being fed after the document is ejected backward from the document transport route; and
a transport-force-applying mechanism that applies a transport force to the document transported on the document transport route, wherein
the transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction, and
the ejection guide is positioned asymmetrically toward the first-directional side in the width direction.

2. The image reading apparatus according to claim 1, wherein
the ejection guide is disposed only within an area of the document transport route on the first-directional side with respect to a central location in the width direction.

3. The image reading apparatus according to claim 1, wherein
the reader is movable toward or away from the document transport route,
the transport-force-applying mechanism includes
a transport roller that nips the document with the reader,
a first pressing member is a pressing member that is disposed on the first-directional side in the width direction and that presses the reader against the transport roller, and
a second pressing member is a pressing member that is disposed on the second-directional side in the width direction and that presses the reader against the transport roller, and
a pressing force generated by the first pressing member is set to be greater than a pressing force generated by the second pressing member.

4. The image reading apparatus according to claim 1, further comprising:
a second reader that reads an image of the document, the second reader being disposed opposite a first reader, the first reader corresponding to the reader; and
a plurality of transport roller pairs that transport the document, the plurality of transport roller pairs being arranged on the document transport route in the width direction, the plurality of transport roller pairs being disposed upstream of the first reader and the second reader, wherein
a document nip force generated by a transport roller pair positioned on the first-directional side in the width direction is set to be greater than a document nip force generated by a transport roller pair positioned on the second-directional side in the width direction.

5. The image reading apparatus according to claim 1, wherein
the ejection guide is removable from a main body in which the document transport route is formed.

6. The image reading apparatus according to claim 1, wherein
the ejection guide is switchable between a first state in which the document being ejected is upwardly guided and a second state in which a ratio of a projected area to a footprint of the image reading apparatus becomes smaller than the ratio in the first state.

7. The image reading apparatus according to claim 6, wherein
when in the second state, the ejection guide is supported on an upper surface of the image reading apparatus.

8. The image reading apparatus according to claim 7, further comprising an operation unit on the upper surface, the image reading apparatus being configured to receive various operations through the operation unit, wherein
when in the second state, the ejection guide is disposed outside the operation unit.

9. The image reading apparatus according to claim 7, wherein
when in the second state, the ejection guide is positioned so as not to make contact with the document being ejected backward from the document transport route.

10. The image reading apparatus according to claim 7, wherein
the ejection guide has a through-hole that, when the ejection guide is in the second state, enables a document that is smaller than the ejection guide in the width direction to pass backward through the through-hole.

11. An image reading apparatus, comprising:
a document transport route along which a document inserted into the image reading apparatus from a front side is transported backward;
a reader that reads an image of the document, the reader being disposed on the document transport route;
an ejection guide that upwardly guides the document being fed after the document is ejected backward from the document transport route; and
a transport-force-applying mechanism that applies a transport force to the document transported on the document transport route, wherein the transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction, and the ejection guide forms a document guide route, a length of the document guide route in the width direction being shorter on the second-directional side than on the first-directional side.

12. The image reading apparatus according to claim 11, wherein the reader is movable toward or away from the document transport route, the transport-force-applying mechanism includes
a transport roller that nips the document with the reader,
a first pressing member is a pressing member that is disposed on the first-directional side in the width direction and that presses the reader against the transport roller, and
a second pressing member is a pressing member that is disposed on the second-directional side in the width direction and that presses the reader against the transport roller, and
a pressing force generated by the first pressing member is set to be greater than a pressing force generated by the second pressing member.

13. The image reading apparatus according to claim 11, further comprising:
a second reader that reads an image of the document, the second reader being disposed opposite a first reader, the first reader corresponding to the reader; and
a plurality of transport roller pairs that transport the document, the plurality of transport roller pairs being arranged on the document transport route in the width direction, the plurality of transport roller pairs being disposed upstream of the first reader and the second reader, wherein
a document nip force generated by a transport roller pair positioned on the first-directional side in the width direction is set to be greater than a document nip force generated by a transport roller pair positioned on the second-directional side in the width direction.

14. The image reading apparatus according to claim 11, wherein the ejection guide:
is switchable between a first state in which the document being ejected is upwardly guided and a second state in which a ratio of a projected area to a footprint of the image reading apparatus becomes smaller than the ratio in the first state, and
is supported on an upper surface of the image reading apparatus when in the second state.

15. The image reading apparatus according to claim 14, further comprising an operation unit on the upper surface, the image reading apparatus being configured to receive various operations through the operation unit, wherein
when in the second state, the ejection guide is disposed outside the operation unit.

16. An image reading apparatus, comprising:
a document transport route along which a document inserted into the image reading apparatus from a front side is transported backward;
a reader that reads an image of the document, the reader being disposed on the document transport route;
an ejection guide that upwardly guides the document being fed after the document is ejected backward from the document transport route; and
a transport-force-applying mechanism that applies a transport force to the document transported on the document transport route, wherein
the transport force applied by the transport-force-applying mechanism to a first side of the document is greater than the transport force applied by the transport-force-applying mechanism to a second side of the document, the first side being positioned on a first-directional side in a width direction intersecting a document transport direction, the second side being positioned on a second-directional side that is opposite to the first-directional side in the width direction, and
the ejection guide places a transport load on the document, the transport load placed on the second side of the document in the width direction being lighter than the transport load placed on the first side of the document in the width direction.

17. The image reading apparatus according to claim 16, wherein the ejection guide:
is switchable between a first state in which the document being ejected is upwardly guided and a second state in which a ratio of a projected area to a footprint of the image reading apparatus becomes smaller than the ratio in the first state, and
is supported on an upper surface of the image reading apparatus when in the second state.

18. The image reading apparatus according to claim 17, further comprising an operation unit on the upper surface, the image reading apparatus being configured to receive various operations through the operation unit, wherein
when in the second state, the ejection guide is disposed outside the operation unit.

* * * * *